US008830505B2

(12) United States Patent
Hashimoto

(10) Patent No.: US 8,830,505 B2
(45) Date of Patent: Sep. 9, 2014

(54) APPARATUS THAT TRANSMITS JOB DATA TO TERMINAL, TERMINAL DEVICE, CONTROL METHOD, AND STORAGE MEDIUM

(75) Inventor: Minoru Hashimoto, Chigasaki (JP)

(73) Assignee: Canon Kabushiki Kaisha (JP)

( * ) Notice: Subject to any disclaimer, the term of this patent is extended or adjusted under 35 U.S.C. 154(b) by 349 days.

(21) Appl. No.: 13/149,104

(22) Filed: May 31, 2011

(65) Prior Publication Data

US 2011/0299117 A1 Dec. 8, 2011

(30) Foreign Application Priority Data

Jun. 3, 2010 (JP) ................................. 2010-127787

(51) Int. Cl.
*G06F 3/12* (2006.01)
*G06F 1/32* (2006.01)
*H04N 1/00* (2006.01)

(52) U.S. Cl.
CPC ............ *G06F 1/3203* (2013.01); *G06F 3/1285* (2013.01); *G06F 3/126* (2013.01); *Y02B 60/1267* (2013.01); *Y02B 60/1271* (2013.01); *H04N 1/00896* (2013.01); *G06F 3/1221* (2013.01)
USPC ............ 358/1.15; 358/1.14; 713/320; 399/88

(58) Field of Classification Search
CPC ........... H04N 1/00896; H04N 1/00885; G06F 3/1221; G06F 3/126; G06F 1/3203; G06F 1/3284; G06K 15/402

USPC ......................................................... 358/1.15
See application file for complete search history.

(56) References Cited

U.S. PATENT DOCUMENTS

| | | | | |
|---|---|---|---|---|
| 2003/0053112 | A1* | 3/2003 | Motosugi et al. ............ | 358/1.14 |
| 2006/0087675 | A1* | 4/2006 | Terada et al. ................ | 358/1.14 |
| 2006/0221379 | A1* | 10/2006 | Noda ............................ | 358/1.14 |
| 2007/0247467 | A1* | 10/2007 | Kaneda ......................... | 345/531 |
| 2008/0158574 | A1* | 7/2008 | Sugiyama ..................... | 358/1.1 |
| 2008/0186524 | A1* | 8/2008 | Morimoto .................... | 358/1.13 |
| 2011/0252252 | A1* | 10/2011 | Ramakrishnan et al. ..... | 713/320 |

FOREIGN PATENT DOCUMENTS

| | | | |
|---|---|---|---|
| JP | 11-015551 | A | 1/1999 |
| JP | 2000-020179 | A | 1/2000 |
| JP | 2004-237468 | A | 8/2004 |
| JP | 2008-167224 | A | 7/2008 |

\* cited by examiner

*Primary Examiner* — Benjamin O Dulaney
(74) *Attorney, Agent, or Firm* — Rossi, Kimms & McDowell LLP

(57) ABSTRACT

A apparatus (cloud) that transmits job data to a terminal (MFP), which is capable of causing the terminal to execute a job without wastefully consuming electric power immediately after completion of job data processing. The cloud generates job data, and determines whether or not the MFP is in a first state in which the MFP cannot process the job data immediately. Further, the cloud stores information on a time period required for the MFP to shift from the first state to a second state in which the MFP can process the job data immediately. The cloud transmits an instruction for causing the MFP to shift from the first state to the second state, to the MFP, based on a time period required for generating the job data, and the time period indicated by the information.

8 Claims, 20 Drawing Sheets

FIG. 13

| JOB ID | ACCEPTANCE DATE AND TIME | JOB TYPE | HOST PC INFORMATION | MFP INFORMATION | MFP STATUS | JOB STATUS |
|---|---|---|---|---|---|---|
| 1234 | 2009/11/25 18:01 | PRINT | 123.45.6.78 | 23.45.67.89 | STANDBY | COMPLETED |
| 1235 | 2009/11/25 18:05 | PRINT | 34.56.78.90 | 45.67.8.9 | ENERGY SAVING MODE | IN PROGRESS BY FIRST PROCESSING SERVER |
| 1236 | 2009/11/25 18:11 | PRINT | 11.22.33.44 | 55.66.77.88 | BEING PRINTING | IN PROGRESS BY SECOND PROCESSING SERVER |
| 1237 | 2009/11/25 18:13 | PRINT | 34.56.78.100 | 45.67.8.9 | ENERGY SAVING MODE | RECEIVED |
| 1238 | 2009/11/25 18:15 | PRINT | 34.56.78.110 | 45.67.8.9 | ENERGY SAVING MODE | BEING RECEIVING |

FIG. 14

| JOB ID | ACCEPTANCE DATE AND TIME | JOB TYPE | HOST PC INFORMATION | MFP INFORMATION | MFP STATUS | JOB STATUS |
|---|---|---|---|---|---|---|
| 1234 | 2009/11/25 18:01 | PRINT | 123.45.6.78 | 23.45.67.89 | STANDBY | COMPLETED |
| 1235 | 2009/11/25 18:05 | PRINT | 34.56.78.90 | 45.67.8.9 | ENERGY SAVING MODE | IN PROGRESS BY FIRST PROCESSING SERVER REMAINING SIZE: 40MB |
| 1236 | 2009/11/25 18:11 | PRINT | 11.22.33.44 | 55.66.77.88 | BEING PRINTING | IN PROGRESS BY SECOND PROCESSING SERVER REMAINING SIZE: 30MB |
| 1237 | 2009/11/25 18:13 | PRINT | 34.56.78.100 | 45.67.8.9 | ENERGY SAVING MODE | RECEIVED |
| 1238 | 2009/11/25 18:15 | PRINT | 34.56.78.110 | 45.67.8.9 | ENERGY SAVING MODE | BEING RECEIVING |

FIG. 15

| JOB ID | ACCEPTANCE DATE AND TIME | JOB TYPE | HOST PC INFORMATION | MFP INFORMATION | MFP STATUS | JOB STATUS |
|---|---|---|---|---|---|---|
| 1234 | 2009/11/25 18:01 | PRINT | 123.45.6.78 | 23.45.67.89 | STANDBY | COMPLETED |
| 1235 | 2009/11/25 18:05 | PRINT | 34.56.78.90 | 45.67.8.9 | ENERGY SAVING MODE | IN PROGRESS BY FIRST PROCESSING SERVER REMAINING PAGE COUNT : 11 |
| 1236 | 2009/11/25 18:11 | PRINT | 11.22.33.44 | 55.66.77.88 | BEING PRINTING | IN PROGRESS BY SECOND PROCESSING SERVER REMAINING PAGE COUNT : 20 |
| 1237 | 2009/11/25 18:13 | PRINT | 34.56.78.100 | 45.67.8.9 | ENERGY SAVING MODE | RECEIVED |
| 1238 | 2009/11/25 18:15 | PRINT | 34.56.78.110 | 45.67.8.9 | ENERGY SAVING MODE | BEING RECEIVING |

FIG. 17

| JOB ID | ACCEPTANCE DATE AND TIME | JOB TYPE | HOST PC INFORMATION | MFP INFORMATION | MFP STATUS | JOB STATUS |
|---|---|---|---|---|---|---|
| 1234 | 2009/11/25 18:01 | PRINT PDL | 123.45.6.78 | 23.45.67.89 | STANDBY | COMPLETED |
| 1235 | 2009/11/25 18:05 | PRINT TIFF | 34.56.78.90 | 45.67.8.9 | ENERGY SAVING MODE | IN PROGRESS BY FIRST PROCESSING SERVER REMAINING SIZE: 40MB |
| 1236 | 2009/11/25 18:11 | PRINT PDL | 11.22.33.44 | 55.66.77.88 | BEING PRINTING | IN PROGRESS BY SECOND PROCESSING SERVER REMAINING SIZE: 30MB |
| 1237 | 2009/11/25 18:13 | PRINT PDL | 34.56.78.100 | 45.67.8.9 | ENERGY SAVING MODE | RECEIVED |
| 1238 | 2009/11/25 18:15 | PRINT PDL | 34.56.78.110 | 45.67.8.9 | ENERGY SAVING MODE | BEING RECEIVING |

FIG. 18

| JOB ID | ACCEPTANCE DATE AND TIME | JOB TYPE | HOST PC INFORMATION | MFP INFORMATION | MFP STATUS | JOB STATUS |
|---|---|---|---|---|---|---|
| 1234 | 2009/11/25 18:01 | PRINT | 123.45.6.78 | 23.45.67.89 iR5000 | STANDBY | COMPLETED |
| 1235 | 2009/11/25 18:05 | PRINT | 34.56.78.90 | 45.67.8.9 iR7000 | ENERGY SAVING MODE | IN PROGRESS BY FIRST PROCESSING SERVER REMAINING SIZE: 40MB |
| 1236 | 2009/11/25 18:11 | PRINT | 11.22.33.44 | 55.66.77.88 iR7000 | BEING PRINTING | IN PROGRESS BY SECOND PROCESSING SERVER REMAINING SIZE: 30MB |
| 1237 | 2009/11/25 18:13 | PRINT | 34.56.78.100 | 45.67.8.9 iR7000 | ENERGY SAVING MODE | RECEIVED |
| 1238 | 2009/11/25 18:15 | PRINT | 34.56.78.110 | 45.67.8.9 iR7000 | ENERGY SAVING MODE | BEING RECEIVING |

*FIG. 19*

| MODEL NAME | RETURN TIME | Sc |
|---|---|---|
| iR5000 | 5 SEC. | 40MB |
| iR7000 | 10 SEC. | 80MB |

APPARATUS THAT TRANSMITS JOB DATA TO TERMINAL, TERMINAL DEVICE, CONTROL METHOD, AND STORAGE MEDIUM

BACKGROUND OF THE INVENTION

1. Field of the Invention

The present invention relates to an apparatus that transmits job data to a terminal, a terminal device, a control method, and a storage medium, and more particularly to return control for causing the terminal device to return from an energy saving mode when the terminal device and the apparatus as an external apparatus execute a job in a cooperative manner.

2. Description of the Related Art

In recent years, a software usage pattern is becoming popular in which software provided on a network (the Internet, for example) is used without executing an application in each of information processing apparatuses, such as host computers, of respective users. As such a technique for using software on the Internet, so-called cloud computing has come to be known.

In the cloud computing, a cloud generally comprises a plurality of server apparatuses, but each user need not be aware of which server apparatus is executing software such as programs. The cloud computing is characterized by providing various types of services in response to user requests.

By using such cloud computing, it is possible for the user not only to suppress the installation of a new information processing apparatus of a user's own and the like but also to suppress the purchase of new application programs. This is advantageous for the user in that initial expenditure can be reduced. As a consequence, the above-described cloud computing is coming to be used in terminal devices (e.g. printers of image forming apparatuses, etc.) which execute printing and the like.

By the way, as a terminal device, an MFP (multifunction peripheral) is known, for example, which has a copy function, a FAX function, a printing function, a scan function, and so forth. When the cloud computing is applied to the MFP, the MFP supports only basic functions, and has additional functions thereof executed by the cloud on the network. This makes it possible to reduce the costs of the MFP itself, and what is more, add greater functionality to the MFP.

When the MFP and the cloud computing cooperate with each other, job data (print data) in a format incompatible with the MFP is converted by the cloud to a job data format compatible with the MFP, for example, whereby printing is performed by the MFP.

This makes it possible to make new functions substantially available using the cloud without expanding the range of functions of the MFP to the new functions. As a result, it is possible to suppress costs required for the MFP.

On the other hand, one of major concerns about the MFP is reduction of power consumption. In view of this, some MFPs have a so-called energy saving mode (mode for reducing power consumption).

In this energy saving mode, power consumption is reduced by energizing only a detection circuit for detecting a factor requiring the MFP to return from the energy saving mode. When the detection circuit detects the factor, the MFP is returned from the energy saving mode, whereby electric power is supplied to functions which necessitate electric power.

In the MFP connected to the cloud, for example, packets received from the cloud are monitored by a network controller, to determine whether or not there is a factor requiring the MFP to return from the energy saving mode, in any of the received packets (see e.g. Japanese Patent Laid-Open Publication No. H11-15551). Therefore, it is necessary for the MFP connected to the cloud to enable the network controller to operate also in the energy saving mode.

On the other hand, there is a system in which an information processing apparatus connected to a cloud via a network receives job data from the cloud, and then transfers the job data to an MFP.

In this system, when the MFP is in the energy saving mode, the information processing apparatus issues a return-from-energy-saving command for causing the MFP to return from the energy saving mode to the MFP, thereby causing the MFP to return from the energy saving mode (see e.g. Japanese Patent Laid-Open Publication No. 2000-20179).

However, when the cloud processes the job data, and the MFP performs printing according to the processed job data, it sometimes takes time for the cloud to complete the processing of the job data.

For example, when the amount of job data or the number of pages received by the cloud is large, it takes time to process the job data. Further, when the cloud is performing other processing (processing of other job data to be printed by the MFP, for example), it sometimes takes time to complete new processing.

Further, as the number of information processing apparatuses, such as host computers, and MFPs, which are installed and use the cloud, becomes larger, the possibility that a larger number of jobs are concentrated in the cloud becomes higher.

In such a case, if the cloud having received job data issues a return-from-energy-saving command to the MFP immediately after reception of the job data, the MFP can wait for a long time period in a state returned from the energy saving mode until the MFP receives processed job data. This results in wasteful power consumption of the MFP.

On the other hand, if the cloud issues a return-from-energy-saving command to the MFP after completion of processing the job data, it is possible to prevent wasteful power consumption of the MFP.

However, since it takes time for the MFP to return from the energy saving mode, it takes time to start execution of a job by the MFP in spite of the completion of the job data processing.

For example, although depending on the specifications and operating state of the MFP, a time period required before the MFP can start a job after receiving the return-from-energy-saving command is approximately 10 seconds at shortest and several minutes at longest.

SUMMARY OF THE INVENTION

The present invention provides an apparatus that transmits job data to a terminal, which is capable of causing the terminal to execute a job without wastefully consuming electric power immediately after completion of job data processing, a terminal device, a control method, and a storage medium.

In a first aspect of the present invention, there is provided an apparatus for transmitting job data to a terminal, comprising a generation unit configured to generate job data, a determination unit configured to determine whether or not the terminal is in a first state in which the terminal cannot process the job data immediately, a storage unit configured to store information on a time period required for the terminal to shift from the first state to a second state in which the terminal can process the job data immediately, and an instruction unit configured to transmit an instruction for causing the terminal to shift from the first state to the second state to the terminal, based on a time period required for the generation unit to generate the job data, and the time period indicated by the information stored in the storage unit.

In a second aspect of the present invention, there is provided a terminal device that is connectable to a host computer and an external apparatus, comprising a shift unit configured to cause the terminal device to shift to a first state in which the terminal device cannot process job data immediately, a transfer unit configured to be operable when job data is received from the host computer after the shift unit has caused the terminal device to shift to the first state, to transfer the job data to the external apparatus while holding the terminal device in the first state, an instruction reception unit configured to receive an instruction for causing the terminal device to shift from the first state to a second state in which the terminal device can process the job data immediately, from the external apparatus, after the transfer unit has transferred the job data, a data reception unit configured to receive job data processed by the external apparatus, and a processing unit configured to process the job data received by the data reception unit after the terminal device is caused to shift from the first state to the second state according to the received instruction.

In a third aspect of the present invention, there is provided a method of controlling an apparatus for transmitting job data to a terminal, the apparatus including a storage unit configured to store information on a time period required for the terminal to shift from a first state in which the terminal cannot process the job data immediately to a second state in which the terminal can process the job data immediately, comprising generating job data, determining whether or not the terminal is in the first state, and transmitting an instruction for causing the terminal to shift from the first state to the second state to the terminal, based on a time period required for the generation unit to generate the job data, and the time period indicated by the information stored in the storage unit.

In a fourth aspect of the present invention, there is provided a method of controlling a terminal device that is connectable to a host computer and an external apparatus, comprising causing the terminal device to shift to a first state in which the terminal device cannot process job data immediately, transferring, when job data is received from the host computer after the terminal device has been caused to shift to the first state, the job data to the external apparatus while holding the terminal device in the first state, receiving an instruction for causing the terminal device to shift from the first state to a second state in which the terminal device can process the job data immediately, from the external apparatus, after the job data has been transferred, receiving job data processed by the external apparatus, and processing the received job data, after the terminal device is caused to shift from the first state to the second state according to the received instruction.

In a fifth aspect of the present invention, there is provided a non-transitory computer-readable storage medium storing a computer-executable program for causing a computer to execute a method of controlling an apparatus for transmitting job data to a terminal, the apparatus including a storage unit configured to store information on a time period required for the terminal to shift from a first state in which the terminal cannot process the job data immediately to a second state in which the terminal can process the job data immediately, wherein the method comprises generating job data, determining whether or not the terminal is in the first state, and transmitting an instruction for causing the terminal to shift from the first state to the second state to the terminal, based on a time period required for the generation unit to generate the job data, and the time period indicated by the information stored in the storage unit.

In a sixth aspect of the present invention, there is provided a non-transitory computer-readable storage medium storing a computer-executable program for causing a computer to execute a method of controlling a terminal device connectable to a host computer and an external apparatus, wherein the method comprises causing the terminal device to shift to a first state in which the terminal device cannot process job data immediately, transferring, when job data is received from the host computer after the terminal device has been caused to shift to the first state, the job data to the external apparatus while holding the terminal device in the first state, receiving an instruction for causing the terminal device to shift from the first state to a second state in which the terminal device can process the job data immediately, from the external apparatus, after the job data has been transferred, receiving job data processed by the external apparatus, and processing the received job data, after the terminal device is caused to shift from the first state to the second state according to the received instruction.

According to the present invention, under an environment where the apparatus that transmits job data to the terminal, i.e. a server apparatus, and the terminal device process a job in a cooperative manner, the terminal device can be returned from an energy saving mode in appropriate timing. As a consequence, it is possible to reduce power consumption in the terminal device and shorten a waiting time period for completion of processing of the job.

The features and advantages of the invention will become more apparent from the following detailed description taken in conjunction with the accompanying drawings.

BRIEF DESCRIPTION OF THE DRAWINGS

FIG. 13 is a view showing an example of a job management table of the cloud.

FIG. 14 is a view showing another example of the job management table of the cloud.

FIG. 15 is a view showing still another example of the job management table of the cloud.

FIG. 17 is a diagram showing an example of a job management table for use in performing the process of the flowchart described with reference to FIG. 16.

FIG. 18 is a view showing still another example of the job management table of the cloud.

FIG. 19 is a diagram which is useful in explaining a model name-predetermined value that defines the relationship between the model names and a predetermined value shown in FIG. 18.

DETAILED DESCRIPTION OF THE EMBODIMENTS

The present invention will now be described in detail below with reference to the accompanying drawings showing embodiments thereof. Although in the following, a printing system including an apparatus that transmits job data to a terminal and a terminal device according to an embodiment of the present invention is described with reference to the drawings. Note that although the following description is given of the printing system that executes a print job, the present invention can also be applied to any system insofar as it processes job data using a server apparatus, such as a cloud, and a terminal device executes job processing according to the processed job data.

Figure 1:
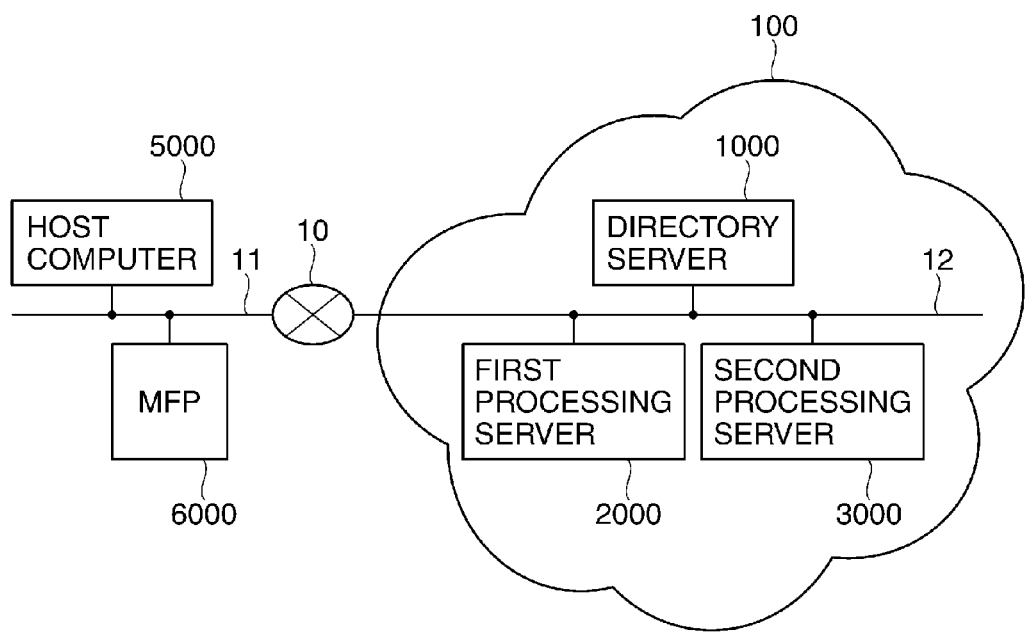
FIG. 1 is a block diagram of a printing system including an apparatus that transmits job data to a terminal and a terminal device according to an embodiment of the present invention.

FIG. 1 is a block diagram of the printing system. In the following description, it is assumed that the printing system performs printing using a cloud server in a cloud computing environment. Further, the term "cloud" is intended to mean a service providing system which is formed by one or a plurality of server apparatuses, and is provided on the Internet. Although in the following, the cloud is described as a system similar to the server apparatus, the number and the type of servers are not limited.

Referring to FIG. 1, the illustrated printing system includes a host computer 5000 as an information processing apparatus, and an MFP (multifunction peripheral) 6000 as a terminal device. The host computer 5000 and the MFP 6000 are connected to each other by a network 11 (e.g. an intranet (LAN)). Although in the illustrated example, only one MFP 6000 is shown, there may exist a plurality of MFPs 6000.

The network 11 is connected to a network 10 (e.g. the Internet). Although a plurality of clouds exist on the Internet 10, only one cloud 100 is shown in the illustrated example.

In the illustrated example, the cloud 100 (server apparatus) includes a directory server 1000, a first processing server 2000, and a second processing server 3000 (although not shown, the cloud 100 includes a billing server as well). These directory server 1000, first processing server 2000, and second processing server 3000 are connected to each other by a network 12.

In this example, the directory server 1000 accepts a job (e.g. a print job) from the host computer 5000 via the network 10. The first and second processing servers 2000 and 3000 process job data (e.g. print job data) according to settings (job configuration) designated by the directory server 1000 and the print job.

Although in the illustrated example, the cloud 100 includes only the first and second processing servers 2000 and 3000, the number of processing servers increases according to the number of functions provided by the cloud 100.

As described above, the host computer 5000 and the MFP 6000 in a user environment and the cloud 100 are connected via the Internet 10 to thereby form the printing system.

In the printing system illustrated in FIG. 1, e.g. print job data in a data format incompatible with the MFP 6000 is converted to print job data in a data format compatible with the MFP 6000 by using the cloud 100. Further, in the illustrated printing system, functions which are not supported by the MFP 6000 are made available by using the cloud 100.

For example, let it be assumed that the MFP 6000 is incompatible with printing of print job data in a PDL (page description language). In this case, the cloud 100 performs conversion processing for converting the print job data to a data format compatible with the MFP 6000, and transfers the converted or processed print job data to the MFP 6000.

Further, the cloud 100 generates and synthesizes additional information, such as a barcode or a copy-forgery-inhibited pattern. Further, similarly, the cloud 100 provides a scanning function.

By the way, when the cloud 100 is used to perform the print job, there are various methods of transferring print job data. For example, there is a method in which the host computer 5000 transmits print job data to the cloud 100, and designates the MFP 6000 which performs printing of the print job data (hereinafter referred to as the "direct-use method").

In this direct-use method, the cloud 100 converts the print job data to processed print job data printable by the MFP 6000, and transfers the processed print job data to the MFP 6000, whereby the MFP 6000 executes the print job according to the processed print job data.

Further, there is another method in which print job data is transmitted from the host computer 5000 to the MFP 6000, and is then transferred from the MFP 6000 to the cloud 100. In this method, the MFP 6000 determines whether or not it is necessary to request the cloud 100 to perform the conversion processing according to the print job data. If it is determined that it is necessary to request the cloud 100 to perform the conversion processing, the MFP 6000 transfers the print job data to the cloud 100 (hereinafter referred to as the "indirect-use method").

In the above indirect-use method, the cloud 100 converts the print job data to processed print job data printable by the MFP 6000, and transfers the processed print job data to the MFP 6000. This causes the MFP 6000 to execute the print job according to the processed print job data.

Although in the printing system illustrated in FIG. 1, it is possible to employ both the direct-use method and the indirect-use method, in the present embodiment, a description is given of a case where the direct-use method is used. Further, the description is given of an example where the cloud 100 converts print job data to processed job data printable by the MFP 6000.

Figure 2:
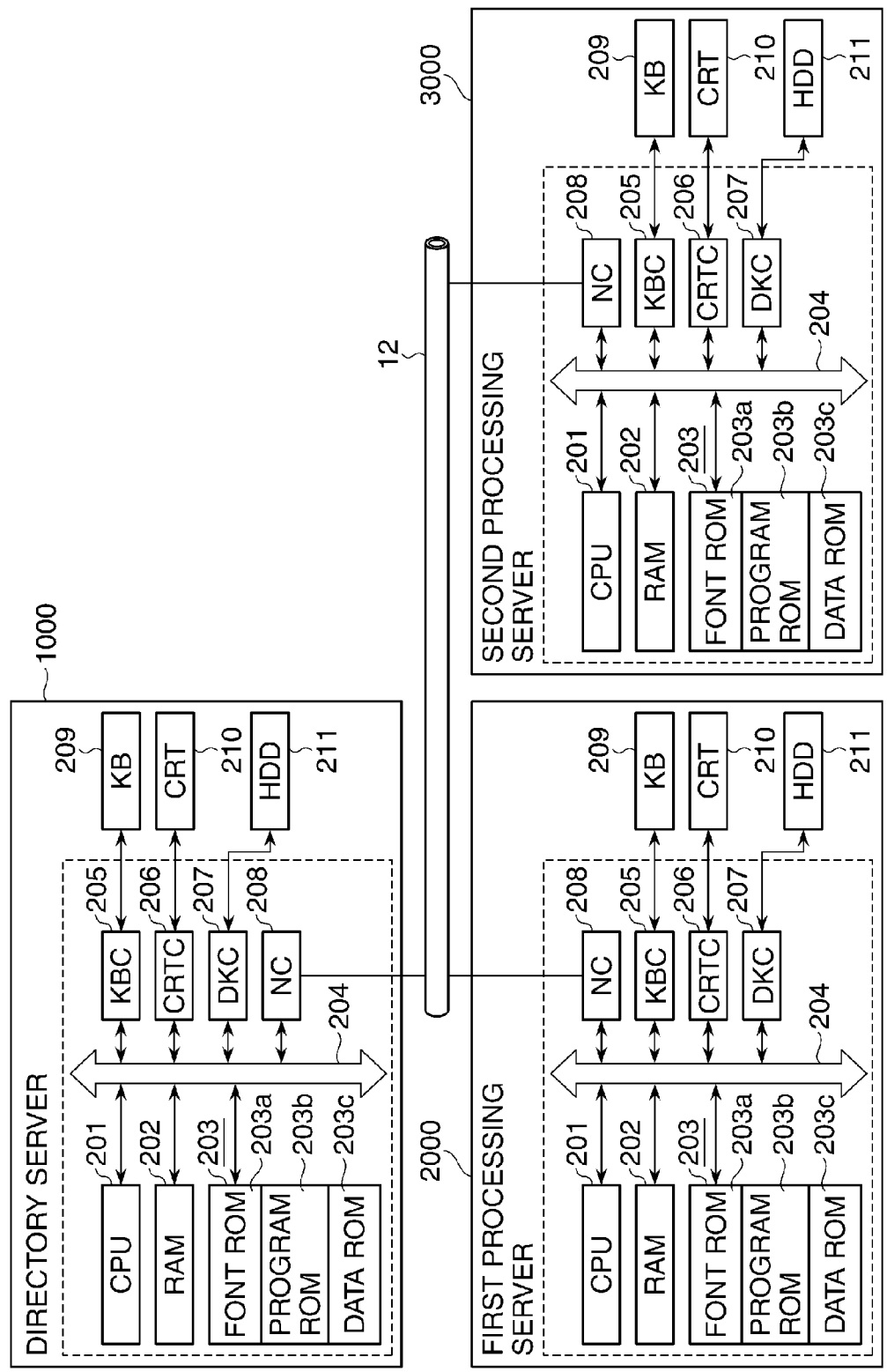
FIG. 2 is a block diagram of the hardware configuration of cloud (server apparatuses) appearing in FIG. 1.

FIG. 2 is a block diagram of the hardware configuration of the cloud (server apparatus) 100 appearing in FIG. 1.

Referring to FIG. 2, the directory server 1000 includes a CPU (central processing unit) 201, a RAM (random access memory) 202, and a ROM (read only memory) section 203. The ROM 203 includes a font ROM 203a, a program ROM 203b, and a data ROM 203c.

The directory server 1000 further includes a keyboard controller (KBC) 205, a CRT controller (CRTC) 206, a disk controller (DKC) 207, and a network controller (NC) 208. These component elements are connected to each other via a system bus 204.

The keyboard controller 205 controls key input by a keyboard (KB) 209 and a pointing device (not shown). The CRT controller 206 controls display by a CRT display (CRT) 210.

The disk controller 207 controls accesses to a hard disk drive (HDD) 211 which stores a boot program, various applications, user files, edited files, etc.

The hard disk drive 211 also stores a list of the MFPs 6000 (MFP list) which can access the cloud 100, a list of print job data being processed (job list), and so forth.

The network controller 208 is connected to the first and second processing servers 2000 and 3000 and the billing server (not shown) via the network 12. The network controller 208 controls communication with the first and second processing servers 2000 and 3000 and the billing server.

The CPU 201 operates according to a control program (operating system (OS)) stored in the program ROM 203b or the hard disk drive 211. The CPU 201 executes a job (also referred to as a "print job") assigning process according to a job accepting program and the like stored in the program ROM 203b or the hard disk drive 211.

That is, the CPU 201 executes a process for assigning a received job to one of the first and second processing servers 2000 and 3000 and the billing server.

To perform the job assigning process or the like, various data used in the job assigning process are stored in advance in the data ROM 203e or the hard disk drive 211. Note that the RAM 202 is used as a main memory, a work area, etc. for the CPU 201. Further, the CPU 201 executes centralized control of all the component elements connected to the system bus 204.

The hardware configuration of the first and second processing servers 2000 and 3000 is the same as that of the directory server 1000, and hence component elements identical to those of the directory server 1000 are denoted by identical reference numerals. Further, in each of the first and second processing servers 2000 and 3000, the program ROM 203b or the hard disk drive 211 stores a job processing program.

Figure 3:
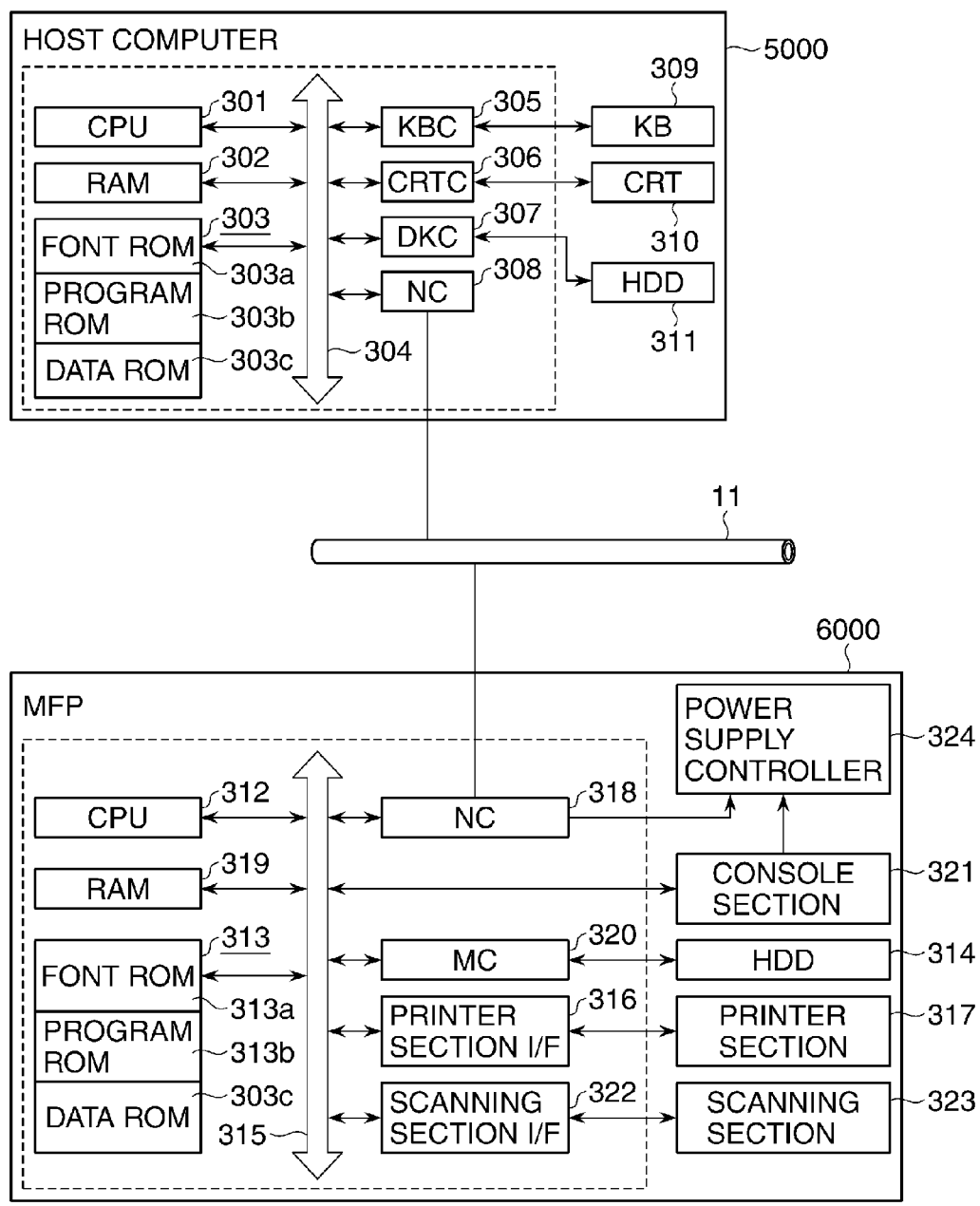
FIG. 3 is a block diagram of the hardware configuration of a host computer and an MFP shown in FIG. 1.

FIG. 3 is a block diagram of the hardware configuration of the host computer 5000 and the MFP 6000 appearing in FIG. 1.

Referring to FIG. 3, the host computer 5000 includes a CPU 301, a RAM 302, a ROM 303, a keyboard controller (KBC) 305, a CRT controller (CRTC) 306, a disk controller (DKC) 307, and a network controller (NC) 308. The ROM 303 includes a font ROM 303a, a program ROM 303b, and a data ROM 303c.

The CPU 301, the RAM 302, the ROM 303, the keyboard controller 305, the CRT controller 306, the disk controller 307, and the network controller 308 are connected to each other by a system bus 304. Further, a keyboard (KB) 309, a CRT display (CRT) 310, and a hard disk drive (HDD) 311 are connected to the keyboard controller 305, the CRT controller 306, and the disk controller 307, respectively. The network controller 308 is connected to the network 11.

In the host computer 5000 appearing in FIG. 3, the program ROM 303b or the hard disk drive 311 stores application programs, a printer control command generation program, and so forth.

The CPU 301 executes a document data generation process for generating document data containing graphics, images, text, and tables (including spreadsheets) in a mixed manner, based on these programs. Further, the CPU 301 executes a print job generation process for document data.

Further, in the host computer 5000, the program ROM 303b or the hard disk drive 311 stores the operating system (OS) as a control program for the CPU 301, etc. Further, the font ROM 303a or the hard disk drive 311 stores font data and the like, which are used during the print job generation process executed on document data.

Note that the data ROM 303c or the hard disk drive 311 stores various data in advance for use during the document data generation process and the print job generation process and so forth.

In the host computer 5000, the network controller 308 is connected to the MFP 6000 and the cloud 100 via the networks 11 and 10 (FIG. 1), for controlling communication with the MFP 6000 and the cloud 100.

The CPU 301 carries out processing for rasterizing an outline font e.g. into a display information RAM secured in the RAM 302. This enables WYSIWYG (What You See Is What You Get) on the CRT display 310. Further, the RAM 302 is used as a main memory, a work area, etc. for the CPU 301.

Further, the CPU 301 opens registered windows based on commands indicated by a mouse cursor (not shown) or the like displayed on the CRT display 310, and executes various types of data processing. To execute a print process, the user can open a window for configuring print settings to configure the MFP 6000 for printing (user input).

In FIG. 3, the MFP 6000 includes a CPU 312, a ROM 313, a printer section interface (I/F) 316, an network controller 318, a RAM 319, a memory controller (MC) 320, and a scanning section interface 322 as the hardware configuration. The ROM 313 comprises a font ROM 313a, a program ROM 313b, and a data ROM 313c.

The network controller 318 is connected to the network 11 and a power supply controller 324. Further, a printer section (printer engine) 317 is connected to the printer section interface 316, and a hard disk drive (HDD) 314 is connected to the memory controller 320. A scanning section 323 is connected to the scanning section interface 322.

As shown in FIG. 3, the component elements of the MFP 6000 are connected to each other by a system bus 315. Furthermore, a console section 321 is connected to the system bus 315.

The MFP 6000 is controlled by the CPU 312 in a normal mode. The CPU 312 operates based on a control program and the like stored in the program ROM 313b or the hard disk drive 314.

During a printing operation, the CPU 312 receives print job data from the host computer 5000. Then, the CPU 312 outputs image data as output information to the printer section 317 via the printer section interface 316, and executes printing of the image data. The font ROM 313a stores font data for use during generation of the image data.

Further, the CPU 312 transfers image data recorded in the hard disk drive 314 to the printer section 317 via the printer section interface 316, and executes printing of the image data.

To carry out a scanning operation, the CPU 312 causes the scanning section 323 to operate via the scanning section interface 322. Then, the CPU 312 stores image data obtained by scanning of an original by the scanning section 323 in the hard disk drive 314 via the memory controller 320.

During the scanning operation, the CPU 312 sends image data to the cloud 100 or the host computer 5000, and transmits and receives various commands and statuses to and from the cloud 100 or the host computer 5000, via the network controller 318, as described hereinafter.

The data ROM 313c has various data and the like stored therein for being used on the host computer 5000, e.g. when the hard disk drive 314 does not exist. Note that the hard disk drive 314 is capable of storing print data and image data generated by the user, as well.

The CPU 312 is capable of communicating with the host computer 5000 and the cloud 100 via the network controller 318. For example, the CPU 312 can notify the host computer 5000 and the cloud 100 of various data, etc. stored in the MFP 6000. The RAM 319 is used as a main memory, a work area, etc. for the CPU 312.

The console section 321 appearing in FIG. 3 includes not only a display device, such as an LCD (liquid crystal display), but also buttons, a touch panel, a keyboard, and a mouse. The user can confirm various instructions to the MFP 6000 and an operating state of the MFP 6000 using the console section 321.

An energy saving mode for reducing power consumption of the MFP 6000 is defined for the MFP 6000. When the MFP 6000 is in the energy saving mode, the user can operate an associated one of the buttons to return the MFP 6000 from the energy saving mode to the normal mode.

The power supply controller 324 manages the power of the MFP 6000. The power supply controller 324 shifts the MFP 6000 to the energy saving mode, the normal mode, a standby mode, or an off state thereof according to instructions given via the network controller 318 or instructions given from the console section 321.

When the MFP 6000 is shifted to the energy saving mode, electric power supply to most of the component elements of the MFP 6000, including the CPU 312, is interrupted. In the illustrated example, the network controller 318 detects a factor requiring the MFP 6000 to return from the energy saving mode to the normal mode. In the energy saving mode, electric power is supplied e.g. to the network controller 318, the console section 321, and the power supply controller 324.

Figure 4:
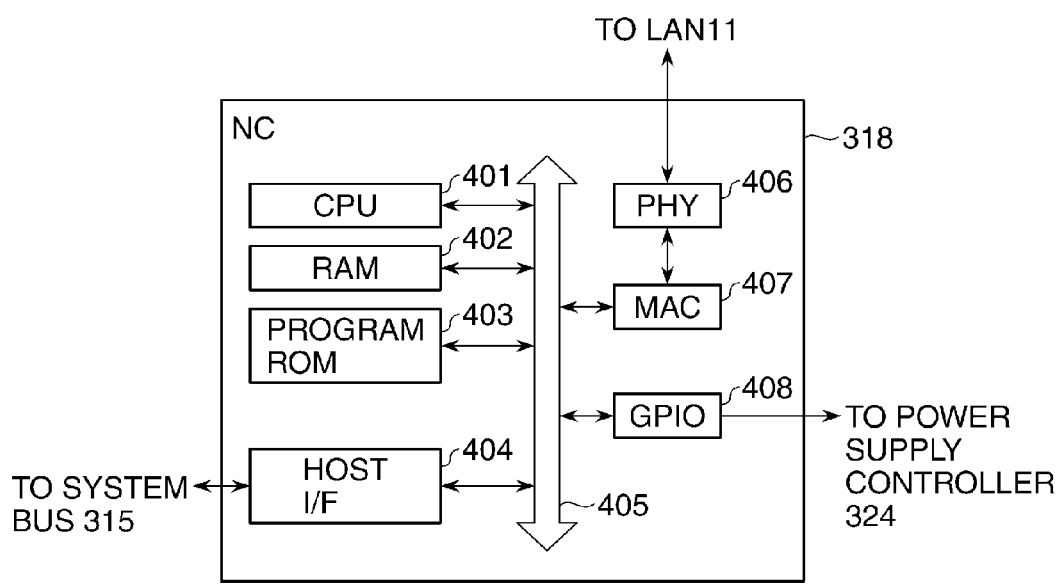
FIG. 4 is a block diagram of the hardware configuration of a network controller provided in the MFP appearing in FIG. 3.

FIG. 4 is a block diagram of the hardware configuration of the network controller 318 provided in the MFP 6000 appearing in FIG. 3.

Referring to FIG. 4, the network controller 318 includes a CPU 401, a RAM 402, a program ROM 403, a host interface (I/F) 404, a physical layer (PHY) section 406, a media access controller (MAC) 407, and a general purpose input/output (GPIO) section 408.

The CPU 401, the RAM 402, the program ROM 403, the host interface 404, the physical layer section 406, the media access controller 407, and the general purpose input/output section 408 are connected to each other by a system bus 405.

The network controller 318 appearing in FIG. 4 is connected to the system bus 315 (FIG. 3) via the host interface 404, and is connected to the network (LAN) 11 (FIG. 3) via the physical layer section 406. Further, the network controller 318 is connected to the power supply controller 324 (FIG. 3) via the general purpose input/output section 408.

When the MFP 6000 is in the energy saving mode, the CPU 401 analyzes a reception packet (also referred to as "received information"), referred to hereinafter, and generates transmission packets, and hence a power-saving CPU is used as the CPU 401.

The CPU 401 executes a program stored in the program ROM 403, and uses the RAM 402 as a work area. The reception packets received via the network 11 are input to the physical layer section 406.

Then, the data format of each reception packet is converted to a data format that can be handled by the CPU 401, by the media access controller 407. The reception packet is once stored in the RAM 402, whereafter it is analyzed by the CPU 401.

To transmit transmission packets (also referred to as "transmission information"), the CPU 401 transfers each transmission packet generated in the RAM 402 to the media access controller 407. Then, the media access controller 407 transmits the transmission packet to the network 11 via the physical layer section 406.

The general purpose input/output section 408 is an input/output port controlled by the CPU 401. As described hereinabove, the general purpose input/output section 408 is connected to the power supply controller 324. The general purpose input/output section 408 includes an output port for giving an instruction for causing the MFP 6000 to return from the energy saving mode. The CPU 401 accesses the general purpose input/output section 408, and gives, via the output port, an instruction for causing the MFP 6000 to return from the energy saving mode to the power supply controller 324.

The CPU 312 (FIG. 3) accesses the network controller 318 via the host interface 404. The host interface 404 is not used in the power-saving mode.

Incidentally, after the MFP 6000 is shifted from the energy saving mode to the normal mode, when the CPU 312 starts to operate, in the course of a process for causing the MFP 6000 to return from the energy saving mode, the CPU 312 sends the CPU 401a stop command for stopping the CPU 401 via the host interface 404. The CPU 401 stops the operation in response to the stop command.

This makes the CPU 312 accessible to the RAM 402 and the media access controller 407, and the network controller 318 is placed under the control of the CPU 312.

Figure 5:
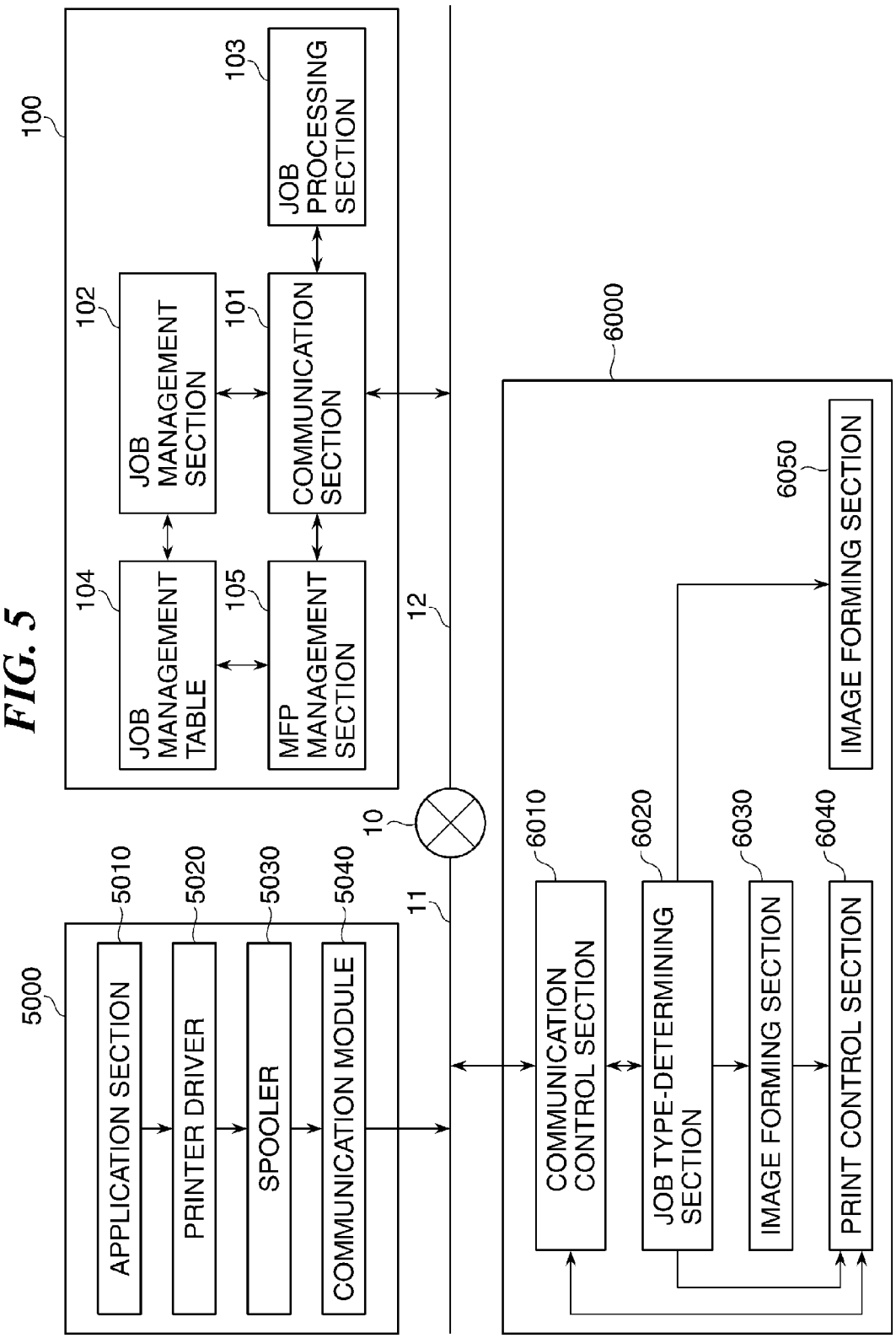
FIG. 5 is a block diagram which is useful in explaining the software configuration of the cloud (server apparatuses), the host computer and the MFP appearing in FIG. 1.

FIG. 5 is a block diagram which is useful in explaining the software configuration of the cloud (server apparatus) 100, the host computer 5000 and the MFP 6000 appearing in FIG. 1. FIG. 5 shows the functions of software installed in the cloud 100, the host computer 5000 and the MFP 6000.

First, when attention is paid to the cloud 100, the functions of the software are executed by the CPU 201 of the directory server 1000 and the first and second processing servers 2000 and 3000. Note that the following description is given of a case where the directory server 1000 and the first and second processing servers 2000 and 3000 integrally operate as the cloud 100.

The software that operates on the cloud 100 includes a communication section 101, a job management section 102, a plurality of job processing sections 103, and an MFP management section 105. The plurality of job processing sections 103 are provided in association with kinds of processes of print jobs, respectively. Further, a job management table 104 is loaded in a storage device (RAM or the like) on the cloud 100.

The communication section 101 is connected to the network (LAN) 12, for transmitting and receiving data, such as packets, to and from the MFP 6000 and the host computer 5000. Examples of the data, such as packets, include print job data, image data, and commands, such as a job start request. Here, polling packets for passing through firewalls are also transmitted and received.

The job management section 102 updates the job management table 104 according to the received job start request and the states of the job processing sections 103, and gives instructions to the job processing sections 103 and the like.

Each job processing section 103 performs conversion of various data. For example, if a job is a print job, the job processing section 103 converts the print job data to processed print job data.

The MFP management section 105 reflects status information on the MFP 6000 received by the communication section 101 on the job management table 104, and then, as described hereinafter, determines return timing for causing the MFP 6000 to return from the energy saving mode to the normal mode.

In the example illustrated in FIG. 5, the communication section 101, the job management section 102, the job management table 104, and the MFP management section 105 are implemented in the directory server 1000 (FIG. 2). Further, the job processing sections 103 are implemented in the first and second processing servers 2000 and 3000.

Subsequently, when attention is paid to the host computer 5000, the functions of the software installed in the host computer 5000 are executed e.g. by the CPU 301 and the network controller 308 of the host computer 5000.

The software that operates on the host computer 5000 includes an application section 5010, a printer driver 5020, a spooler 5030, and a communication module 5040.

Figure 6:
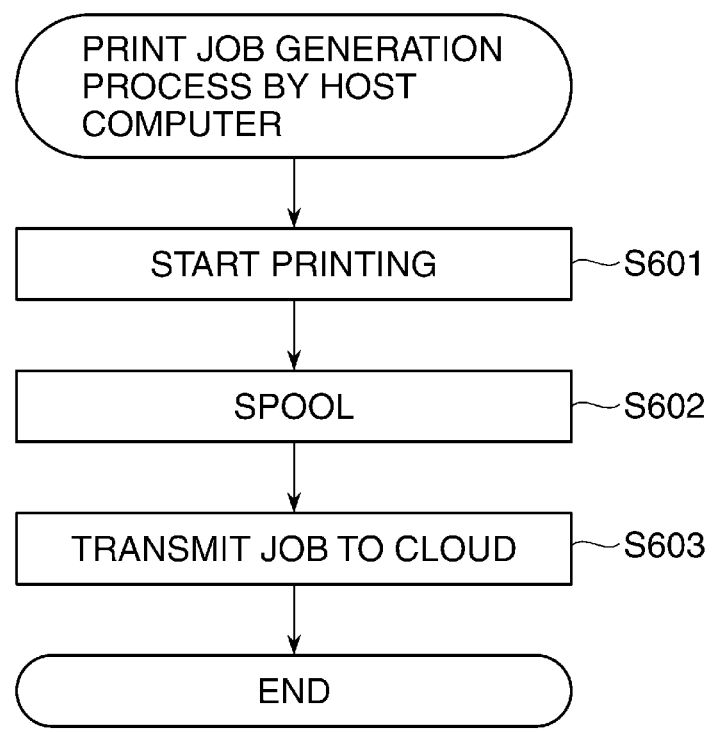
FIG. 6 is a flowchart of a print job generation process carried out by the host computer appearing in FIG. 5.

FIG. 6 is a flowchart of the print job generation process carried out by the host computer 5000 appearing in FIG. 5.

Referring to FIGS. 5 and 6, now, when the user selects a print button, the application section 5010 starts the printer driver 5020 to start printing (step S601). Image data requested to be printed by the application section 5010 is passed to the printer driver 5020. The printer driver 5020 generates print job data according to the image data. The printer driver 5020 spools the print job data in the spooler 5030 (step S602).

The leading end of the print job data includes job request data which is transmitted in the form of packets of a print job request, referred to hereinafter, and is received by the communication section 101 of the cloud 100 in the case of the direct-use method. The job request data includes host information concerning the host computer 5000, MFP information concerning the MFP 6000, which is an output destination, a type of the print job (e.g. whether to print or to store in the hard disk drive), job settings (e.g. copy-forgery-inhibited pattern processing), and so forth.

After that, the communication module 5040 receives the print job data from the spooler 5030, and transmits the same to the cloud 100 (step S603).

In the example illustrated in FIG. 6, the print job data is processed using the cloud 100 (by the direct-use method). Therefore, the print job data is transmitted to the cloud 100, whereas if the cloud 100 is not used (by the indirect-use method), the print job data is directly transmitted to the MFP 6000 alone.

More specifically, the communication module 5040 transmits the print job data to the cloud 100 or the MFP 6000 according to print job settings information included in the print job data.

When transmission destination information in the print job settings information indicates the cloud 100 as a transmission destination, the communication module 5040 transmits the print job data to the cloud 100. On the other hand, when the transmission destination information indicates the MFP 6000 as a transmission destination, the communication module 5040 transmits the print job data to the MFP 6000.

Referring again to FIG. 5, then, when attention is paid to the MFP 6000, the functions of the software of the MFP 6000 are executed by the CPU 312, the printer section 317, the network controller 318, and so forth of the MFP 6000.

The software that operates on the MFP 6000 includes a communication control section 6010, a job type-determining section 6020, image forming sections 6030 and 6050, and a print control section 6040.

In the MFP 6000, upon receipt of a print job request at the leading end of print job data from the host computer 5000 directly or by way of the cloud 100, the communication control section 6010 gives this print job request to the job type-determining section 6020. The job type-determining section 6020 determines the job type of the print job according to the print job request. For example, if it is determined that the job type of the print job is one which uses the cloud 100, the job type-determining section 6020 uses the communication control section 6010 to request the cloud 100 to send processed print job data.

In requesting the cloud 100 to send the processed print job data, polling is performed by the communication control section 6010. In response to the request of the processed print job data, the processed print job data is sent from the cloud 100 to the MFP 6000.

On the other hand, if it is determined that the job type of the print job is one in which the print job can be executed by the MFP 6000 alone, the job type-determining section 6020 gives the print job data to the image forming section 6050. The image forming section 6050 generates print data based on the print job data. Then, the image forming section 6050 forms images based on the print data.

By the way, when the MFP 6000 receives the processed print job data from the cloud 100 via the communication control section 6010, this processed print job data is sent from the communication control section 6010 to the job type-determining section 6020. When it is determined that the processed print job data is sent from the cloud 100, the job type-determining section 6020 sends the processed print job data to the print control section 6040 as well as to the image forming section 6030.

The image forming section 6030 performs image formation based on the processed print job data. Further, the print control section 6040 executes printout processing according to the processed print job data. Upon completion of the printout processing, the print control section 6040 notifies the cloud 100 of the completion of the printout processing on a page-by-page basis via the communication control section 6010.

Here, a description will be given of the operation of the CPU 401 of the network controller 318 of the MFP 6000, appearing in FIG. 4. The MFP 6000 is sometimes installed inside a firewall. This sometimes makes it impossible to transmit packets from the cloud 100 to the MFP 6000 depending on the environment of the network (LAN) 11.

Therefore, the CPU 401 transmits a polling packet to the cloud 100. That is, when the LAN 11 is provided with a mechanism, such as a NAT (network address translation) or a firewall, the CPU 401 transmits a polling packet to the cloud 100. Similarly, the CPU 301 of the host computer 5000 also transmits a polling packet to the cloud 300.

This enables the host computer 5000 and the MFP 6000 to transmit packets to the cloud 100. A response packet from the cloud 100 reaches the host computer 5000 or the MFP 6000, which is a transmission source, as a reception packet. The response packet includes information which the cloud 100 should notify to the transmission source.

Further, as described hereinafter, when the CPU 401 detects a job start request or a return-from-energy-saving command for causing the MFP 6000 to return from the energy saving mode, the CPU 401 generates a return signal for causing the MFP 6000 to return from the energy saving mode to the normal mode. The return-from-energy-saving command is transmitted from the cloud 100 to the MFP 6000 as a response to a polling packet, as described hereinafter.

Further, after the MFP 6000 returns to the normal mode, when a shutdown request is received from the CPU 312, the CPU 401 detects the shutdown request. When the CPU 401 detects the shutdown request, the CPU 401 performs a shutdown process to stop its operation.

In the shutdown process, packet processing is terminated, and the media access controller 407 and the physical layer section 406 are returned to initial states thereof. In short, during the shutdown process, the CPU 401 initializes the media access controller 407 and the physical layer section 406.

Figure 7:
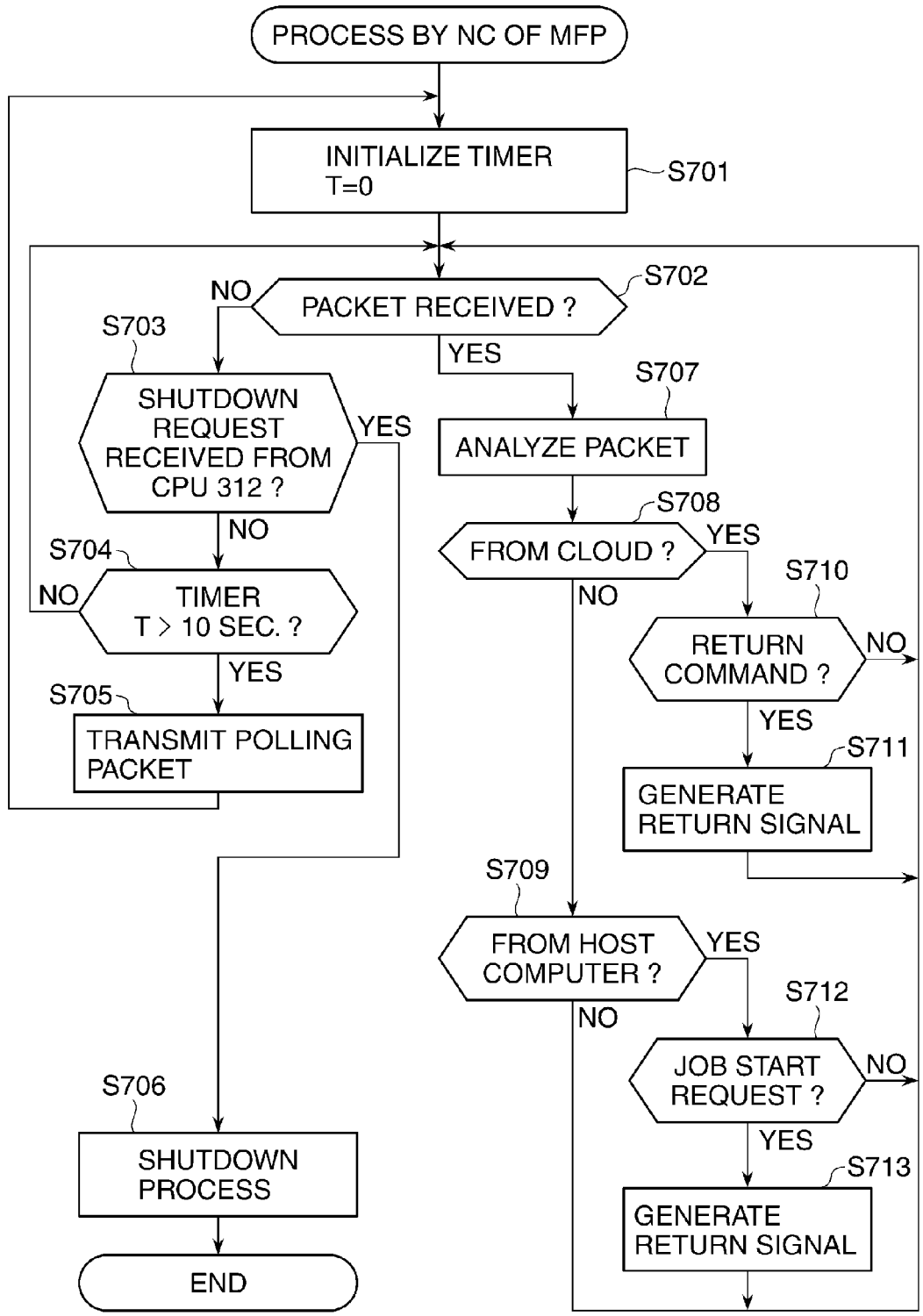
FIG. 7 is a flowchart of a process carried out by the network controller when the MFP appearing in FIG. 3 is in an energy saving mode.

FIG. 7 is a flowchart of a process carried out by the network controller 318 when the MFP 6000 appearing in FIG. 3 is in the energy saving mode.

Referring to FIGS. 3, 4 and 7, first, the CPU 401 initializes an internal timer T (T=0: step S701). This internal timer T is for counting a transmission interval for transmitting the polling packet to the cloud 100. In the illustrated example, the transmission interval is set to 10 seconds.

Then, the CPU 401 checks whether or not a reception packet has been received (step S702). If no received packet has been received (NO to the step S702), the CPU 401 checks whether or not the shutdown request has been received from the CPU 312 (step S703).

If the shutdown request has not been received from the CPU 312 (NO to the step S703), the CPU 401 determines whether or not the count of the internal timer T exceeds the transmission interval (polling interval=10 seconds) (step S704).

If the internal timer T≤10 seconds holds (NO to the step S704), the CPU 401 returns to the step S702 to continue the process.

On the other hand, if the internal timer T>10 seconds holds (YES to the step S704), the CPU 401 generates a polling packet, and transmits the same to the cloud 100. Then, the CPU 401 returns to the step S701 to initialize the internal timer T.

In the step S703, if the shutdown request has been received (YES to the step S703), the CPU 401 performs the shutdown process, followed by terminating the present process.

Further, in the step S702, if a reception packet has been received (YES to the step S702), the CPU 401 analyzes the reception packet (step S707), and determines according to the result of the analysis whether or not the reception packet has been transmitted from the cloud 100 (step S708).

If the reception packet has not been transmitted from the cloud 100 (NO to the step S708), the CPU 401 determines whether or not the reception packet has been transmitted from the host computer 5000 (step S709).

If the reception packet has not been transmitted from the host computer 5000 (NO to the step S709), the CPU 401 returns to the step S702 to continue the process.

If it is determined in the step S708 that the reception packet has been transmitted from the cloud 100 (YES to the step S708), the CPU 401 determines whether or not the reception packet contains the return-from-energy-saving command for causing the MFP 6000 to return from the energy saving mode (step S710). If the reception packet does not contain the return-from-energy-saving command (NO to the step S710), the CPU 401 returns to the step S702 to continue the process.

On the other hand, if the reception packet contains the return-from-energy-saving command (YES to the step S710), the CPU 401 generates a return signal, and gives the return signal to the power supply controller 324 via the media access controller 407 (step S711).

This causes the power supply controller 324 to shift from the energy saving mode to the normal mode. After the CPU 401 is started and until the CPU 401 receives the shutdown request, the network controller 318 is required to continue its operation, and hence the CPU 401 returns to the step S702 to continue the process.

If it is determined in the step S709 that the reception packet has been transmitted from the host computer 5000 (YES to the step S709), the CPU 401 determines whether or not the reception packet is a job start request (step S712).

If the reception packet is a job start request (YES to the step S712), the CPU 401 generates a return signal, and gives the return signal to the power supply controller 324 via the general purpose input/output section 408 (step S713). Then, the CPU 401 returns to the step S702 to continue the process.

If the reception packet is not a job start request (NO to the step S712), the CPU 401 returns to the step S702 to continue the process.

As described hereinabove, in the case where the MFP 6000 is in the energy saving mode, when the network controller 318 receives the return-from-energy-saving command for causing the MFP 6000 to return from the energy saving mode, from the cloud 100, the network controller 318 causes the MFP 6000 to shift to the normal mode.

Figure 8:
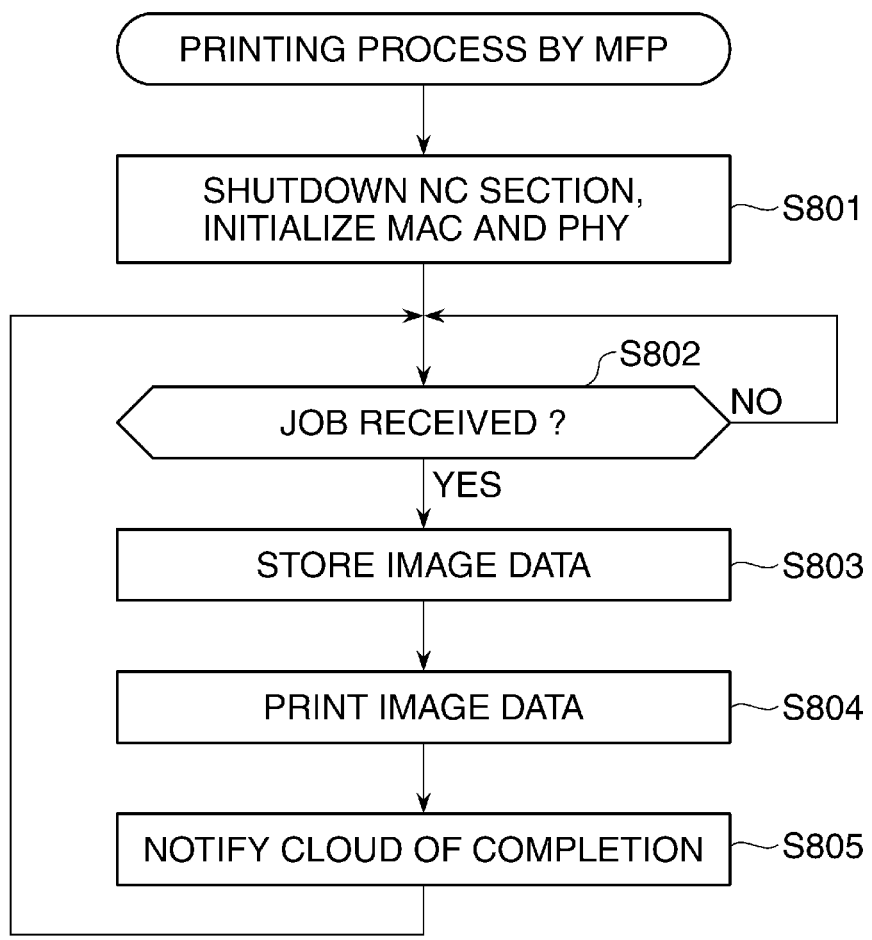
FIG. 8 is a flowchart of a print process carried out after the MFP has returned from the energy saving mode.

FIG. 8 is a flowchart of a print process carried out after the MFP 6000 has returned from the energy saving mode.

Referring to FIGS. 3, 4 and 8, when the MFP 6000 has returned from the energy saving mode, the CPU 312 issues a shutdown request to the network controller 318 (step S801). This initializes the media access controller 407 and the physical layer section 406, as described above. At this time point, the network controller 318 stops the operation to be placed under the control of the CPU 312.

Then, the CPU 312 determines whether or not the MFP 6000 has received a processed print job data from the cloud 100 (step S802). If the MFP 6000 has not received a processed print job data (NO to the step S802), the CPU 312 waits until the MFP 6000 receives processed print job data.

On the other hand, if the MFP 6000 receives a processed print job data (YES to the step S802), the CPU 312 stores the processed print job data, i.e. image data, e.g. in the hard disk drive 314 (step S803). Then, the CPU 312 sends the image data to the printer section 317 via the printer section interface 316, and executes printing (step S804).

Upon completion of the printing, the CPU 312 notifies the cloud 100 of completion of the printout processing, and returns to the step S802 to wait for a next print job.

Although in the example illustrated in FIG. 8, the description has been given of the case where the MFP 6000 receives processed print job data from the cloud 100, for performing printing, the MFP 6000 sometimes directly receives print job data from the host computer 5000, converts the print job data to image data, and then prints the image data, as described hereinabove.

Figure 9:
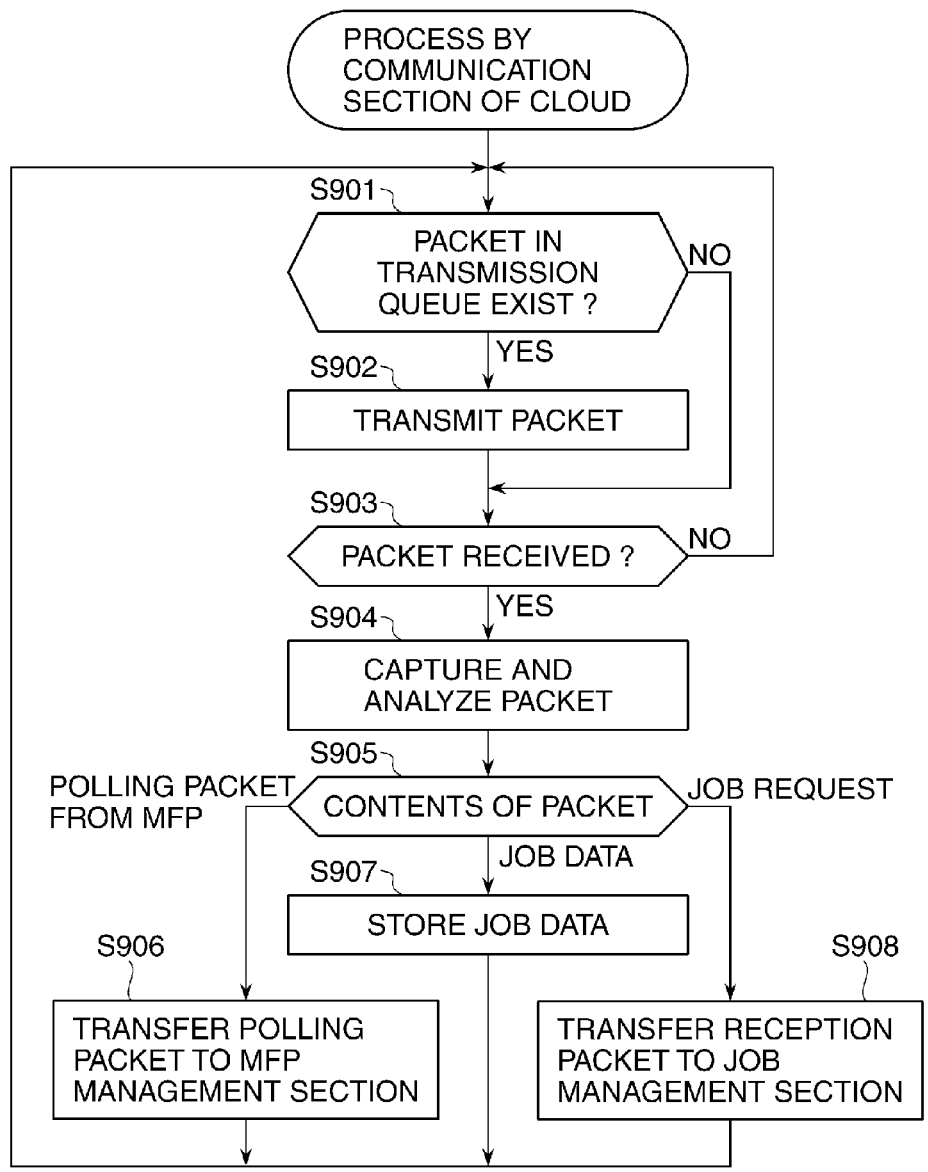
FIG. 9 is a flowchart of a process carried out by a communication section of the cloud.

FIG. 9 is a flowchart of a process carried out by the communication section 101 of the cloud 100 shown in FIG. 5.

Referring to FIGS. 5 and 9, as described above, the communication section 101 is provided in the directory server 1000 appearing in FIG. 2, and is operated by the CPU 201 and the like.

First, the communication section 101 determines whether or not there is a packet in transmission queue (step S901). If there is a packet in transmission queue (YES to the step S901), the communication section 101 transmits the packet in transmission queue (step S902), and then determines whether or not there is a reception packet (step S903).

If there is no packet in transmission queue (NO to the step S901), the communication section 101 proceeds to the step S903. If there is no reception packet (NO to the step S903), the communication section 101 returns to the step S901 to continue the process.

On the other hand, if there is a reception packet (YES to the step S903), the communication section 101 captures and analyzes the reception packet (step S904). Then, the communication section 101 determines the contents of the reception packet according to the result of the analysis (step S905).

If it is determined according to the result of the analysis that the reception packet is a polling packet sent from the MFP 6000 (polling packet in the step S905), the communication section 101 transfers the polling packet to the MFP management section 105 (step S906). Then, the communication section 101 returns to the step S901.

If it is determined according to the result of the analysis that that the reception packet is print job data (i.e. determined to be "job data" in the step S905), the communication section 101 stores the print job data e.g. in the hard disk drive 211 in FIG. 2 (step S907), and then returns to the step S901.

Note that an associated one of the job processing sections 103 checks the print job data and if it is determined that the job type of the print job is "print", the job processing section 103 converts the print job data to processed print job data (i.e. image data).

If it is determined according to the result of the analysis that the reception packet is a print job request (i.e. determined to be "job request" in the step S905), the communication section 101 transfers the reception packet to the job management section 102 (step S908), and then returns to the step S901. When the job management section 102 receives the reception packet, i.e. a print job request in the illustrated example, the job management section 102 handles the print job request as a new job request, and updates the job management table 104.

Figure 10:
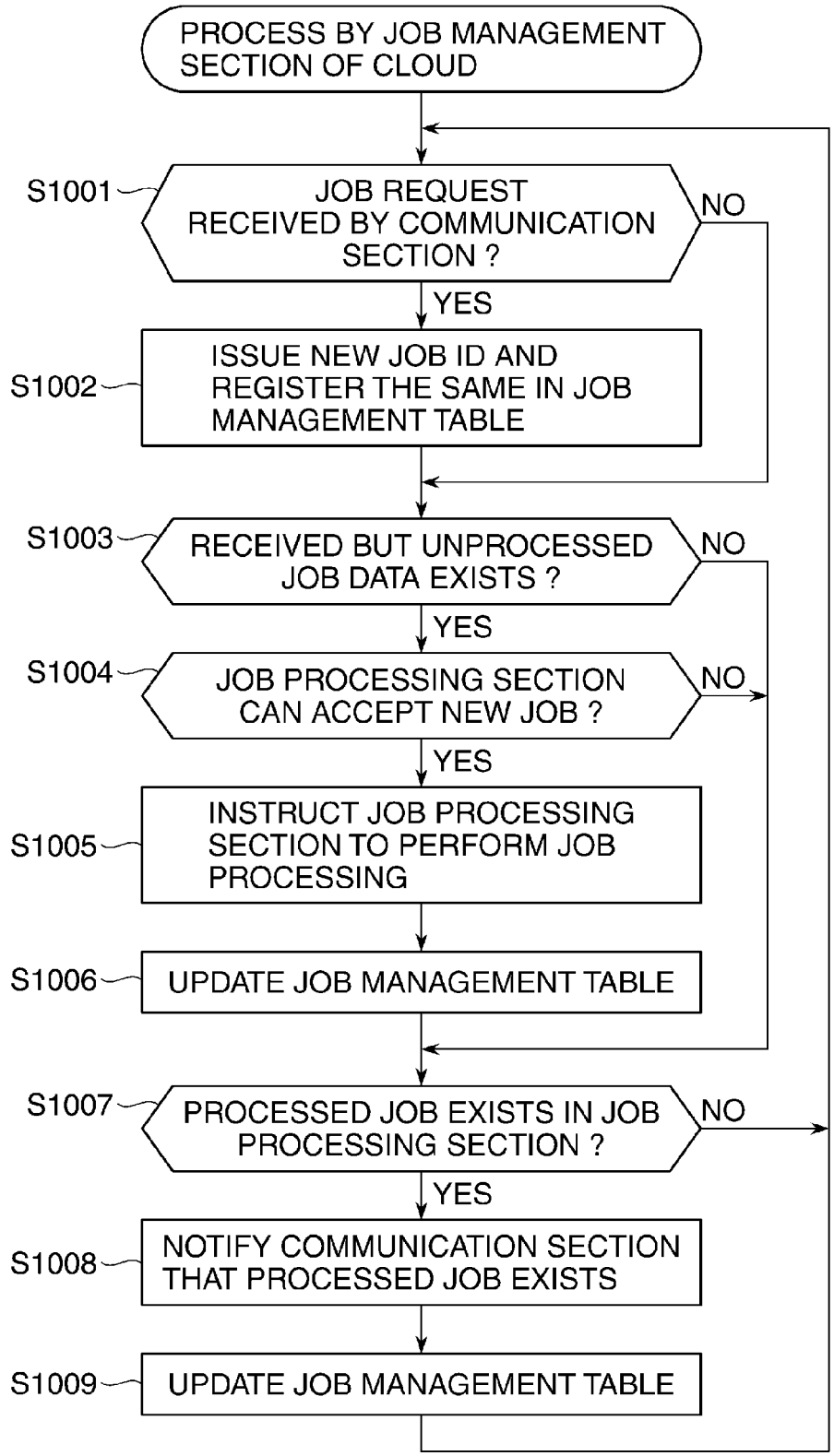
FIG. 10 is a flowchart of a process carried out by a job management section of the cloud.

FIG. 10 is a flowchart of a process carried out by the job management section 102 of the cloud 100 appearing in FIG. 5.

Referring to FIGS. 5 and 10, as described heretofore, the job management section 102 is provided in the directory server 1000 appearing in FIG. 2, and is operated by the CPU 201 and the like.

As described above with reference to FIG. 9, the communication section 101 determines whether or not a print job request has been received (step S1001). If a print job request has been received (YES to the step S1001), the print job request is transferred to the job management section 102. Upon receipt of the print job request, the job management section 102 issues a new job ID to the print job request, and registers the new job ID in the job management table 104 (step S1002).

Subsequently, the job management section 102 refers to the job management table 104, and checks whether or not there is print job data which has been received but is not processed yet (step S1003). In the step S1001, if no print job request has been received (NO to the step S1001), the job management section 102 proceeds to the step S1003.

If there is unprocessed print job data (YES to the step S1003), the job management section 102 checks whether or not any of the job processing sections 103 can accept a new job (step S1004).

If any of the job processing sections 103, i.e. the first or second processing server 2000 or 3000 (FIG. 2) can accept a new job (YES to step S1004), the job management section 102 instructs the job processing section 103 to perform job processing (step S1005).

At this time, the job management section 102 specifies a print job data item received earliest of all accepted print job data items. Upon receipt of the instruction for the job processing, the job processing section 103 receives the print job data via the communication section 101, and converts the print job data to image data. In this case, when the conversion of the print job data is completed, the image data is stored e.g. in the communication section 101.

After instructing the job processing, the job management section 102 updates the job management table 104 (step S1006). For example, the job management section 102 changes the status of the print job request from "in queue" to "in progress". When the print job data is being converted by the first processing server 2000, the status of the print job request is denoted as "in progress by first processing server 2000". Similarly, when the print job data is being converted by the second processing server 3000, the status of the print job request is denoted as "in progress by second processing server 3000".

Then, the job management section 102 checks whether or not there is print job data having been processed by the job processing section 103 (step S1007). If there is processed print job data (YES to the step S1007), the job management section 102 notifies the communication section 101 that there is a processed job (step S1008). This makes it possible for the communication section 101 to transmit processed print job data.

Next, the job management section 102 updates the job management table 104 (step S1009). For example, the job management section 102 changes the status of the print job (conversion processing in the illustrated example) from "in progress" to "completed". After that, the job management section 102 returns to the step S1001 to continue the process.

On the other hand, if it is determined in the step S1007 that there is no processed print job data (NO to the step S1007), the job management section 102 returns to the step S1001. Further, if it is determined in the step S1003 that there is no unprocessed print job data (NO to the step S1003), the job management section 102 proceeds to the step S1007. Similarly, if it is determined in the step S1004 that none of the job processing sections 103, i.e. neither the first processing server 2000 or the second processing server 3000 in FIG. 2 cannot accept a new job (NO to step S1004), the job management section 102 proceeds to the step S1007.

Figure 11:
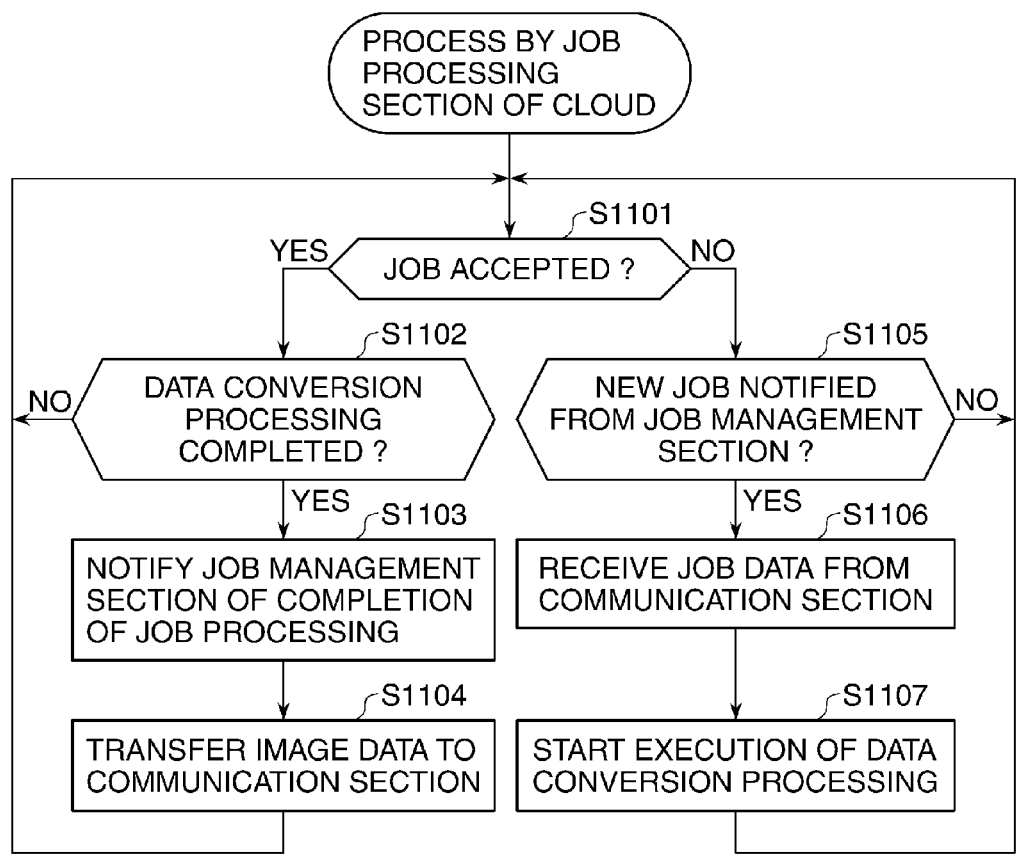
FIG. 11 is a flowchart of a process carried out by job processing sections of the cloud.

FIG. 11 is a flowchart of a process carried out by the job processing sections 103 of the cloud 100 appearing in FIG. 5.

Referring to FIGS. 5 and 11, as described hereinabove, the job processing sections 103 are provided in the first and second processing servers 2000 and 3000. The first and second processing servers 2000 and 3000 perform the process independently of and in parallel with each other.

First, each job processing section 103 checks whether or not a print job (i.e. one for conversion processing in the illustrated example) has currently been accepted (step S1101). If a print job has been accepted (YES to the step S1101), the job processing section 103 checks whether or not data conversion processing of the print job has been terminated (step S1102). If the data conversion processing is being performed (NO to the step S1102), the job processing section 103 returns to the step S1101.

On the other hand, if the data conversion processing has been terminated (YES to the step S1102), the job processing section 103 notifies the job management section 102 of termination of the job processing (step S1103). This causes the job management section 102 to update the job management table 104.

Sequentially, the job processing section 103 transfers processed print job data generated by the conversion processing to the communication section 101 (step S1104), and then returns to the step S1101.

If it is determined in the step S1101 that the a print job has not been accepted (NO to the step S1101), that is, if the job processing section 103 is waiting for reception of a print job, the job processing section 103 checks whether or not a new job has been notified from the job management section 102 (step S1105). If no new job is notified from the job management section 102 (NO to the step S1105), the job processing section 103 returns to the step S1101.

On the other hand, if a new job is notified from the job management section 102 (YES to the step S1105), the job processing section 103 receives print job data from the communication section 101 (step S1106). Then, the job processing section 103 executes data conversion processing on the print job data (step S1107), and then returns to the step S1101.

Figure 12:
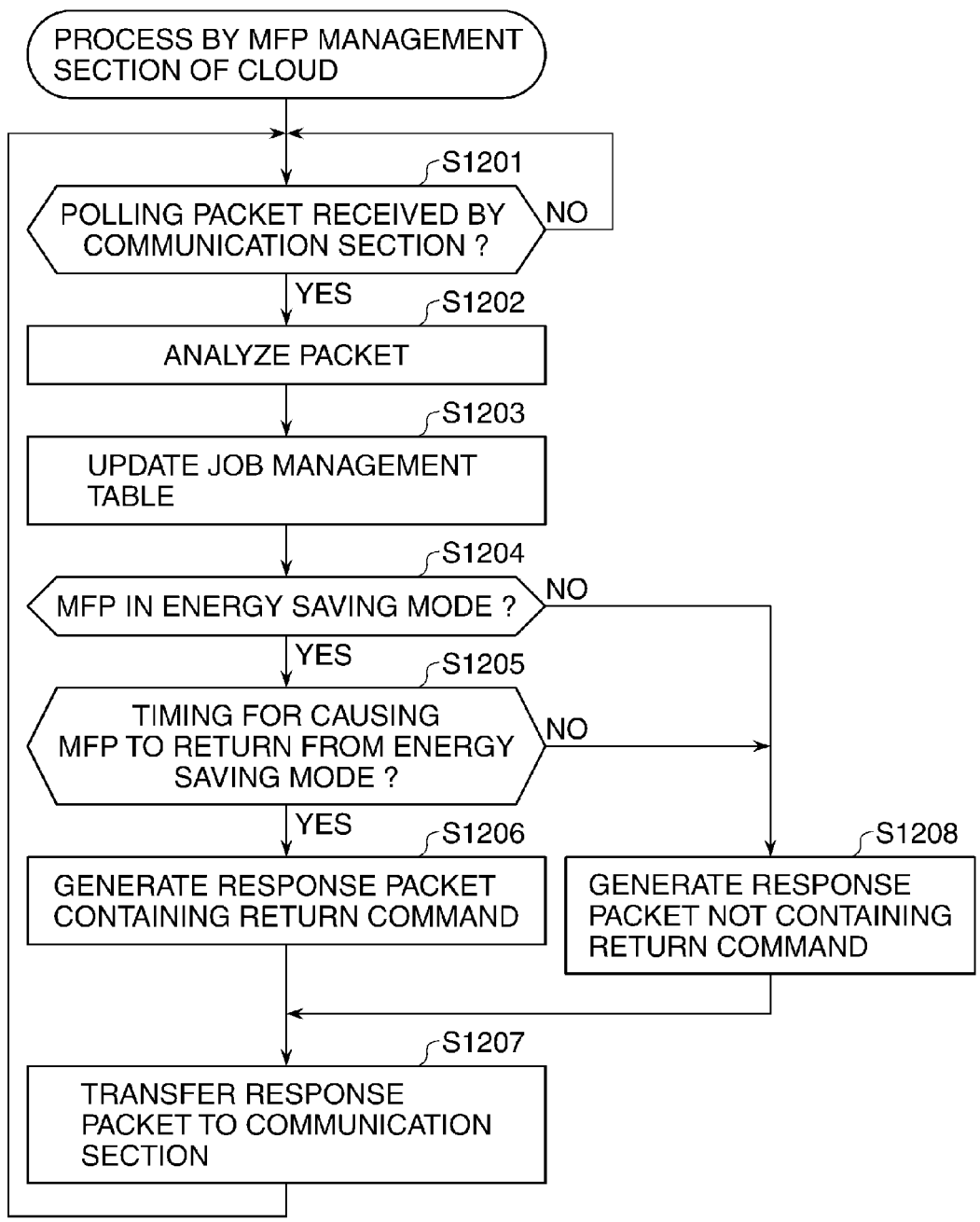
FIG. 12 is a flowchart of a process carried out by an MFP management section of the cloud.

FIG. 12 is a flowchart of a process carried out by the MFP management section 105 of the cloud 100 appearing in FIG. 5.

Referring to FIGS. 5 and 12, as described hereinabove, the MFP management section 105 is provided in the directory server 1000, and is operated by the CPU 201 and the like.

The MFP management section 105 determines whether or not the communication section 101 has received a polling packet (step S1201). If the communication section 101 has received no polling packet (NO to step S1201), the MFP management section 105 is on standby. That is, the MFP management section 105 waits until the communication section 101 receives a polling packet.

If it is determined that the communication section 101 has received a polling packet (YES to step S1201), the MFP management section 105 analyzes the polling packet (step S1202). Then, the MFP management section 105 updates the job management table 104 according to the result of the analysis (step S1203).

The MFP management section 105 updates the job management table 104 when a change has occurred in an item of the MFP status in the job management table 104. For example, when the MFP 6000 has shifted from the energy saving mode to a standby mode, the MFP management section 105 updates the job management table 104.

Then, the MFP management section 105 refers to the job management table 104, and determines whether or not the MFP 6000 is in the energy saving mode (step S1204). If the MFP 6000 is in the energy saving mode (YES to the step S1204), the MFP management section 105 determines whether or not it is return timing for causing the MFP 6000 to return from the energy saving mode (step S1205).

Here, the MFP management section 105 determines whether or not it is return timing for causing the MFP 6000 to return from the energy saving mode according to whether or not print job processing requested by the MFP 6000 is started by the job processing section 103.

In general, it takes time for the job processing section 103 to perform the print job processing. Therefore, if a time period required to return the MFP 6000 from the energy saving mode is set such that it offsets a time period required to perform the print job processing, the MFP 6000 is prevented from being caused to wait until it receives image data after returning from the energy saving mode. That is, the difference between a time period required to generate image data and a time period required for the MFP 6000 to return to the normal mode is not so large that the MFP 6000 is prevented from being caused to wait until it receives image data after returning from the energy saving mode.

If it is determined that it is timing for causing the MFP 6000 to return from the energy saving mode (Yes to the step S1205), the MFP management section 105 generates a response packet to the polling packet, which contains a command for causing the MFP 6000 to return from the energy saving mode (step S1206). Then, the MFP management section 105 transfers the response packet to the communication section 101 (step S1207).

Thus, the communication section 101 transmits the response packet to the MFP 6000. After that, the MFP management section 105 returns to the step S1201 to continue the process.

On the other hand, if it is determined that it is not timing for causing the MFP 6000 to return from the energy saving mode (NO to the step S1205), the MFP management section 105 generates a response packet to the polling packet which does not contain the command for causing the MFP 6000 to return from the energy saving mode (step S1208). The MFP management section 105 proceeds to the step S1207 to transmit the response packet to the communication section 101. After that, the MFP management section 105 returns to the step S1201 to continue the process.

In the step S1204, if the MFP 6000 is not in the energy saving mode (NO to the step S1204), the MFP management section 105 proceeds to the step S1208.

As described above, the MFP management section 105 issues the return-from-energy-saving command in response to the polling packet transmitted from the MFP 6000. Therefore, when polling packets are received from a plurality of MFPs 6000, it is possible to issue the return-from-energy-saving commands to the respective MFPs 6000 in the optimum return timing.

FIG. 13 is a view showing an example of the job management table 104 of the cloud 100 appearing in FIG. 5.

In the example illustrated in FIG. 13, the job management table 104 comprises a job ID column, an acceptance date and time column, a job type column, a host computer (host PC) information column, an MFP information column, an MFP status column, and a job status column.

In the job ID column, job IDs specific to print job requests are recorded. In the acceptance date and time column, dates and times when the print job requests have been accepted are recorded. In the job type column, the types of the print job requests (e.g. print) are recorded. Although in the illustrated example, only "print" is recorded as job types, when scanning is also supported, "print" and "scan" are recorded in a manner distinguished from each other.

Further, in the host computer information column, e.g. the IP addresses of the host computers 5000 are recorded as host computer information. In the MFP information column, e.g. the IP addresses of the MFPs 6000 are recorded as MFP information. In the illustrated example, the IP address of the MFPs associated with a job ID 001235, a job ID 001237, and a job ID 001238 is "45.67.8.9", which indicates that the three jobs are print jobs for the same MFP.

In the MFP status column, current statuses of the MFPs (e.g. energy saving mode, standby, being printing, etc.) are recorded. Although not shown, the MFP statuses include the status of off mode.

In the job status column, the statuses of jobs (e.g. completed, in progress, received, and being receiving) are recorded. Although not shown, the job statuses include the status of being printing. Further, the status of in progress shows that an associated job is being processed by one of the first and second processing servers 2000 and 3000.

In the aforementioned first example, the MFP management section 105 issues the return-from-energy-saving command for causing the MFP 6000 to return from the energy saving mode in timing in which job processing by the first or second processing server 2000 or 3000 is started (return timing).

However, depending on print job data, it can take a long time to process the same. Therefore, the MFP 6000 is sometimes caused to wait before it receives processed print job data after returning from the energy saving mode to the normal mode (e.g. the standby mode).

To solve the above problem, in a second example, the return timing for causing the MFP 6000 to return from the energy saving mode is determined according to the size of unprocessed print job data (unprocessed amount). For example, the job management section 102 determines the size of unprocessed print job data to update the job management table 104. The MFP management section 105 refers to the job management table 104 (i.e. refers to the size of unprocessed print job data), and when the size of unprocessed print job data (i.e. unprocessed part) becomes equal to or smaller than a predetermined value (predetermined amount), the MFP management section 105 issues the return-from-energy-saving command for causing the MFP 6000 to return from the energy saving mode.

Here, when the size of unprocessed print job data is represented by Sj, and the predetermined value is represented by Sc, a condition for issuing the return-from-energy-saving command is expressed by the following equation (1):

$$Sj \leq Sc \tag{1}$$

FIG. 14 is a view showing another example of the job management table 104 of the cloud 100 appearing in FIG. 5.

In the example illustrated in FIG. 14, similarly to the job management table 104 illustrated in FIG. 13, the job management table comprises a job ID column, an acceptance date and time column, a job type column, a host computer (host PC) information column, an MFP information column, an MFP status column, and a job status column.

In the job management table 104 illustrated in FIG. 14, when the job status of print job data is "in progress", one of the first and second processing servers 2000 and 3000, which is processing the print job data, is recorded in the job status column. Further, the size of unprocessed (remaining) print job data (remaining size (MB)) is also recorded in the job status column.

Here, the above-described predetermined value Sc is set e.g. to 40 MB. In the example illustrated in FIG. 14, since the size of unprocessed print job data of print job data having a job ID of 001235 has become 40 MB, the MFP management section 105 issues the return-from-energy-saving command according to the equation (1).

It is necessary to set the predetermined value Sc in advance in the MFP management section 105 or the like. In doing this, it is only required to predict the size of print job data which can be processed over a time period taken for the MFP 6000 to shift to the normal mode after receiving the return-from-energy-saving command from the cloud 100, and set the predetermined value Sc.

Further, in a third example, the job management section 102 acquires unprocessed page count information indicating the number of pages of unprocessed print job data from the job processing section 103. Then, the job management section 102 stores the unprocessed page count information in the job management table 104.

The MFP management section 105 refers to the job management table 104 (i.e. refers to the unprocessed page count information). When the number of unprocessed pages (unprocessed amount) becomes smaller than the predetermined number of pages (predetermined amount), the MFP management section 105 determines that it is the return timing for causing the MFP 6000 to return from the energy saving mode, and issues the return-from-energy-saving command.

Here, when the number of unprocessed pages is represented by Pj, and the predetermined number of pages is represented by Pc, a condition for issuing the return-from-energy-saving command is expressed by the following equation (2):

$$Pj \leq Pc \tag{2}$$

FIG. 15 is a view showing still another example of the job management table 104 of the cloud 100 appearing in FIG. 5.

In the example illustrated in FIG. 15, similarly to the job management table 104 illustrated in FIG. 13, the job management table comprises a job ID column, an acceptance date and time column, a job type column, a host computer (host PC) information column, an MFP information column, an MFP status column, and a job status column.

In the job management table 104 illustrated in FIG. 15, when the job status of print job data is "in progress", one of the first and second processing servers 2000 and 3000, which is processing the print job data, is recorded in the job status column. Further, unprocessed page count information (remaining page count) is also recorded in the job status column.

Here, the above-described predetermined page count Pc is set e.g. to 10 pages. In the example illustrated in FIG. 15, in the case of a job ID 001235, since the number of unprocessed pages is 11 pages, the MFP management section 105 does not issue the return-from-energy-saving command for causing the MFP 6000 to return from the energy saving mode according to the equation (2).

It is necessary to set the predetermined page count Pc in advance in the MFP management section 105 or the like. In doing this, it is only required to predict the number of pages which can be processed over a time period taken for the MFP 6000 to shift to the normal mode after receiving the return-from-energy-saving command from the cloud 100, and set the predetermined page count Pc.

In a fourth example, the issue of the return-from-energy-saving command for causing the MFP 6000 to return from the energy saving mode is controlled according to the format of print job data. For example, a time period required for data conversion processing is sometimes largely changed depending on the contents of the print job data, such as a data format and the number of colors thereof. Particularly when it takes a very short time period to complete data conversion processing, it is necessary to issue the return-from-energy-saving command immediately.

To perform conversion of the format of print job data, if the data format thereof is a PDL format, it is necessary to perform vector operations many times. Therefore, to convert the print job data in the PDL format, it takes longer time in proportion to the amount or the number of pages of the print job data.

On the other hand, in general, data conversion processing for converting print job data in a bitmap image format, such as TIFF (tagged image file format), is completed in a short time.

Therefore, in the fourth example, when the format of print job data is TIFF, the MFP management section 105 issues the return-from-energy-saving command immediately irrespective of the number of unprocessed pages or the size of unprocessed data of the print job data.

In this example, upon receipt of a job processing request, the job management section 102 stores data type information indicating the format of print job data (hereinafter simply referred to as the "data type") in the job management table 104.

The MFP management section 105 refers to the job management table 104 (i.e. the data type information). If the data type is TIFF, when the job processing section 103 starts to perform job processing, the MFP management section 105 issues the return-from-energy-saving command immediately.

On the other hand, if the data type is the PDL format, the MFP management section 105 issues the return-from-energy-saving command according e.g. to the size of unprocessed print job data, as described in the second example.

Figure 16:
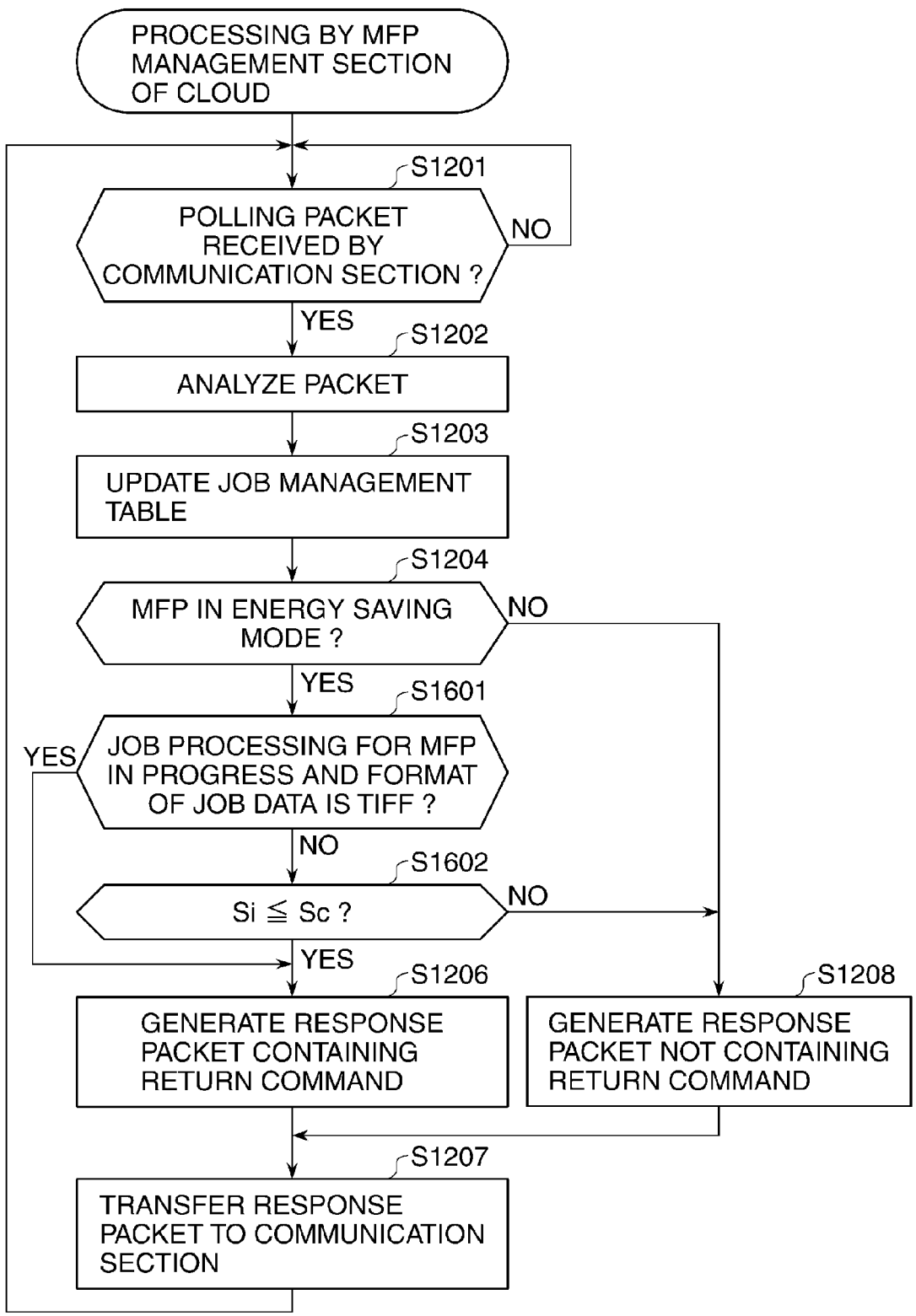
FIG. 16 is a flowchart of a variation of the process carried out by the MFP management section of the cloud.

FIG. 16 is a flowchart of a variation of the process carried out by the MFP management section 105 of the cloud 100 appearing in FIG. 5.

In FIG. 16, steps identical to the steps of the flowchart described with reference to FIG. 12 are denoted by identical reference numerals, and detailed description thereof is omitted.

Referring to FIGS. 5 and 16, as described with reference to FIG. 12, in the step S1204, the MFP management section 105 refers to the job management table 104 to determine whether or not the MFP 6000 is in the energy saving mode. If the MFP 6000 is not in the energy saving mode (NO to the step S1204), the MFP management section 105 proceeds to the step S1208, wherein the MFP management section 105 generates a response packet which does not contain the return-from-energy-saving command.

On the other hand, if the MFP 6000 is in the energy saving mode (YES to the step S1204), the MFP management section 105 checks whether or not print job data for the MFP 6000 is being processed, and at the same time the data format thereof is TIFF (step S1601).

If the print job data is being processed, and at the same time the data format thereof is TIFF (YES to the step S1601), the MFP management section 105 proceeds to the step S1206 to generate a response packet which contains the return-from-energy-saving command. If the print job data is being processed, but the data format thereof is not TIFF (NO to the step S1601), the MFP management section 105 compares the size Sj of unprocessed print job data and the predetermined value Sc, and determines whether or not Sj≤Sc holds (step S1602).

If Sj≤Sc holds (YES to the step S1602), the MFP management section 105 proceeds to the step S1206 to generate a response packet which contains the return-from-energy-saving command. On the other hand, if Sj>Sc holds (NO to the step S1602), the MFP management section 105 proceeds to the step S1208, wherein the MFP management section 105 generates a response packet which does not contain the return-from-energy-saving command.

FIG. 17 is a diagram showing an example of a job management table 104 for use in performing the process of the flowchart described with reference to FIG. 16.

In the example illustrated in FIG. 17, similarly to the job management table 104 illustrated in FIG. 14, the job management table comprises a job ID column, an acceptance date and time column, a job type column, a host computer (host PC) information column, an MFP information column, an MFP status column, and a job status column.

In the job management table 104 illustrated in FIG. 17, not only the types of jobs (e.g. print) but also data type information of job data are recorded in the job type column. In the illustrated example, "PDL" or "TIFF" is recorded as the data type information.

In the above-mentioned fourth example, whether or not the return-from-energy-saving command is to be issued is determined according to the data type and the size of unprocessed print job data. Here, the number of unprocessed pages may be used instead of the size of unprocessed print job data. Further, whether or not the return-from-energy-saving command is to be issued may be determined according to the format of image data, such as monochrome printing and color printing, instead of the data type.

In a fifth example, a description will be given of a case where whether or not the return-from-energy-saving command is to be issued is determined by also taking the model of the MFP 6000 into account. The return time period required for the MFP 6000 to return from the energy saving mode is different depending on the model of the MFP 6000. Although in any of the above-described second to fourth examples, it is possible to take the model of the MFP 6000 into account, now, a case in which the model of the MFP 6000 is taken into account in the second example will be described, by way of example.

FIG. 18 is a view showing still another example of the job management table 104 of the cloud 100 appearing in FIG. 5.

In the example illustrated in FIG. 18, similarly to the job management table 104 illustrated in FIG. 14, the job management table comprises a job ID column, an acceptance date and time column, a job type column, a host computer (host PC) information column, an MFP information column, an MFP status column, and a job status column.

In the job management table 104 illustrated in FIG. 18, not only the ID addresses of MFPs but also items of model information (iR5000, iR7000, etc.) indicating the models of the MFPs are recorded in the MFP information column. The model information of each MFP is transmitted from the MFP 6000 to the cloud 100 using the polling packet. The MFP management section 105 extracts the model information (model name) from the polling packet, and stores the same in the job management table 104.

FIG. 19 is a diagram which is useful in explaining a model name-predetermined value that defines the relationship between model names and predetermined values Sc shown in FIG. 18.

As shown in FIG. 19, the model name-predetermined value table comprises a model name column, a return time column, and a predetermined value Sc column. Return time periods and the predetermined values Sc are defined in a manner associated with the model names.

This model name-predetermined value table is stored e.g. in the job management table 104. The MFP management section 105 refers to the model name-predetermined value table to read a return time period and a predetermined value Sc associated with each model name in the model name column.

The predetermined value Sc is defined according to the size of data on which the job processing section 103 can execute data conversion processing during an associated return time period.

Figure 20:
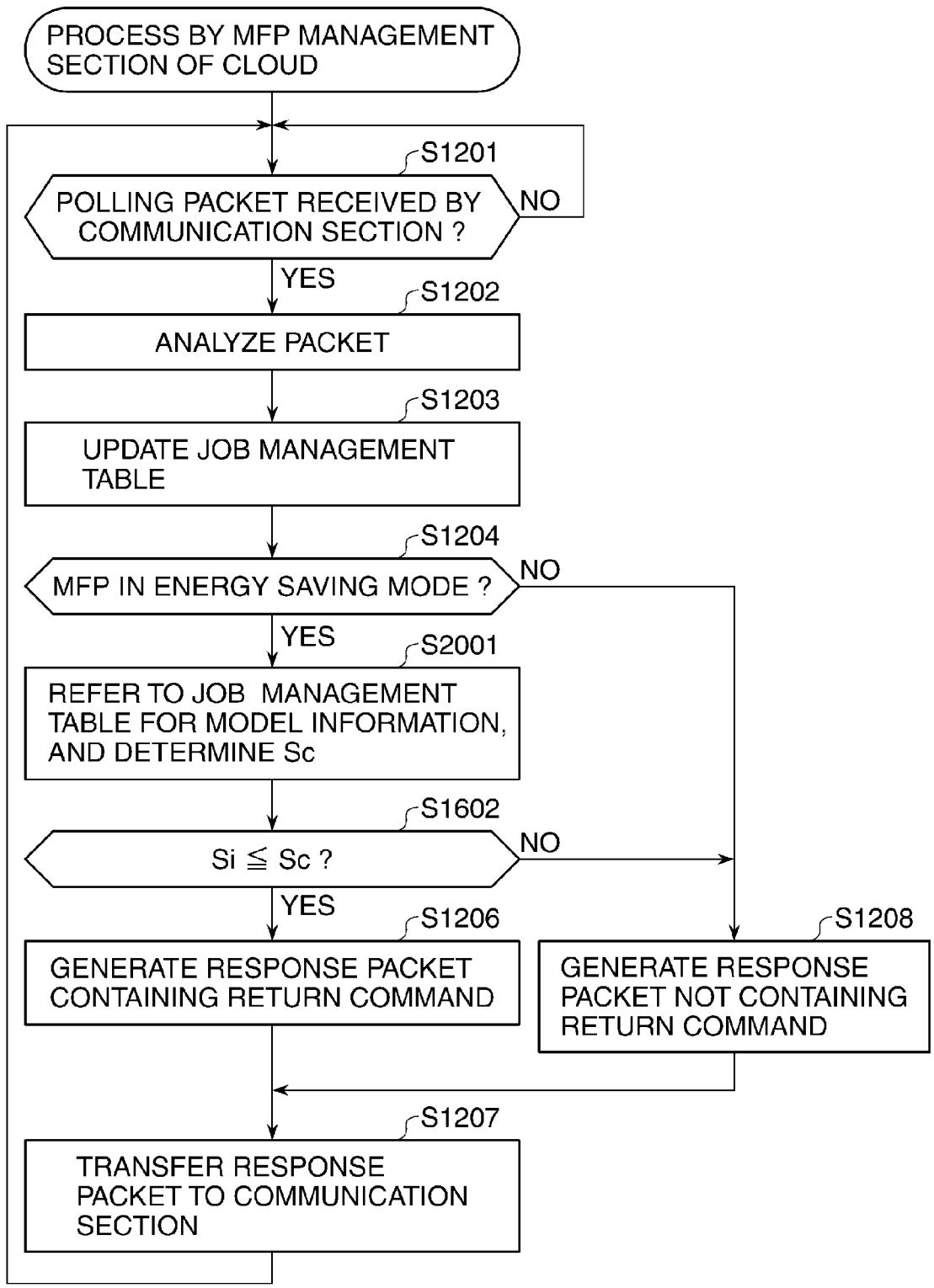
FIG. 20 is a flowchart of a process carried out by the MFP management section using the job management table appearing in FIG. 18.

FIG. 20 is a flowchart of a process carried out by the MFP management section 105 using the job management table 104 appearing in FIG. 18.

In FIG. 20, steps identical to the steps of the flowchart described with reference to FIGS. 12 and 16 are denoted by identical reference numerals, and detailed description thereof is omitted.

Referring to FIGS. 5, 18, 19, and 20, as described with reference to FIG. 12, in the step S1204, the MFP management section 105 refers to the job management table 104 to determine whether or not the MFP 6000 is in the energy saving mode. If the MFP 6000 is not in the energy saving mode (NO to the step S1204), the MFP management section 105 proceeds to the step S1208, wherein the MFP management section 105 does not insert the return-from-energy-saving command into the response packet.

On the other hand, if the MFP 6000 is in the energy saving mode (YES to the step S1204), first, the MFP management section 105 obtains a model name from the MFP information in the job management table 104. Then, the MFP management section 105 refers to the model name-predetermined value table to obtain a return time period and a predetermined value Sc associated with the model name (step S2001).

Subsequently, the MFP management section 105 refers to the job management table 104, and compares the size Sj of unprocessed print job data and the predetermined value Sc to thereby determine whether or not Sj≤Sc holds (step S1602).

If Sj≤Sc holds (YES to the step S1602), the MFP management section 105 proceeds to the step S1206 to generate a response packet which contains the return-from-energy-saving command. On the other hand, if Sj>Sc holds (NO to the step S1602), the MFP management section 105 proceeds to the step S1208, wherein the MFP management section 105 generates a response packet which does not contain the return-from-energy-saving command.

As described above, in the fifth example, since the predetermined value Sc is changed according to the model type of the MFP 6000, it is possible to solve the problem that the return time period required for the MFP 6000 to return from the energy saving mode is different depending on the model of the MFP 6000. That is, the MFP 6000 can be returned from the energy saving mode in more optimum timing according to the model of the MFP 6000.

As described hereinabove, according to the present embodiment, in a case where the cloud 100 and the MFP 6000 process a job (e.g. a print job) in a cooperative manner, when the MFP 6000 is in the energy saving mode, it is possible to cause the MFP 6000 to return from the energy saving mode in appropriate timing.

As is clear from the above description, in the cloud 100, the job processing section 103 shown in FIG. 5 functions as a job processing unit. Further, the MFP management section 105, the job management section 102, and the communication section 101 function as an energy saving mode-determining unit and a return-from-energy-saving command unit.

Furthermore, the job management section 102 functions as an unprocessed amount-obtaining unit, and the MFP management section 105 functions as a data type-obtaining unit. Further, the job management section 102 functions as a predetermined amount-setting unit.

In the MFP 6000, the network controller 318 and the power supply controller 324 appearing in FIG. 3 function as an energy saving mode-setting unit, a first return unit, and a second return unit.

Although a description has been given of the embodiment of the present invention, the present invention is by no means limited to the above-described embodiment, but it includes various forms insofar as they do not depart from the spirit and scope thereof.

Although in the above-described embodiment, a case where the direct-use method is employed is described by way of example, it is also possible to execute the invention by using an in-direct use method. In this case, when the MFP 6000 receives print job data from the host computer 5000, the network controller 318 transfers the received print job data to the cloud 100. At this time, the MFP 6000 continues to maintain the energy saving mode. Thereafter, the MFP 6000 receives an instruction for returning from the energy saving mode to the normal mode, from the cloud 100. Further, the MFP 6000 receives print job data processed by the cloud 100, from the cloud 100. After returning to the normal mode, the MFP 6000 executes print processing according to the processed print job data. The process described above is executed by the operation of the MFP 6000 when the indirect-use method is employed. In this case, the network controller 318 of the MFP 6000 determines during the energy saving mode whether or not it is necessary to cause the cloud 100 to process print job data received from the host computer. Then, depending on a result of the determination, switching is performed between transferring print job data to the cloud 100 while maintaining the energy saving mode and returning to the normal mode to execute print processing without transferring the print job data to the cloud 100.

The functions of the above-described embodiment can be realized as a control method by causing computers provided in the cloud 100 and the MFP 6000 to execute the control method.

In this case, it is possible to cause the computers provided in the cloud 100 and the MFP 6000 to execute a control program having the functions of the above-described embodiment.

In this case, the control method and the control program include at least a job processing step, an energy saving mode determination step, and a return-from-energy-saving command step.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2010-127787 filed Jun. 3, 2010, which is hereby incorporated by reference herein in its entirety.

What is claimed is:

1. An apparatus for transmitting job data to a terminal, comprising:
a generation unit configured to generate the job data;
an instruction unit configured to transmit, when the terminal is in an energy saving mode, to the terminal an instruction for causing the terminal to shift from the energy saving mode to a normal mode in which the terminal device can process the job data;
a storage unit configured to store information on a time period required for the terminal to shift from the energy saving mode to the normal mode after the instruction has been transmitted from said instruction unit; and
a determination unit configured to determine whether or not it is timing for transmitting the instruction, based on a time period required for said generation unit to generate the job data, and the time period indicated by the information stored in said storage unit;
wherein said instruction unit transmits the instruction to the terminal in the case where said determination unit determines that it is the timing for transmitting the instruction.

2. The apparatus according to claim 1, wherein the energy saving mode is a mode in which power consumption by the terminal is smaller than in the normal mode.

3. The apparatus according to claim 1, further comprising a transmission unit configured to transmit the job data to the terminal after said instruction unit transmits the instruction.

4. The apparatus according to claim 1, wherein said generation unit generates the job data according to a request from an information processing apparatus connected to the apparatus via a network.

5. The apparatus according to claim 1, wherein said generation unit generates the job data according to a request from the terminal.

6. The apparatus according to claim 1, wherein the terminal is a printer, the job data being print data.

7. A method of controlling an apparatus for transmitting job data to a terminal comprising:
   generating the job data;
   instructing, when the terminal is in the energy saving mode, the terminal to shift from the energy saving mode to a normal mode in which the terminal device can process the job data; and
   storing, in a storage unit, information on a time period required for the terminal to shift to the normal mode after the instructing; and
   determining, based on a time period required for generating the job data, and the time period indicated by the information stored in the storage unit, whether or not it is timing for the instructing,
   wherein said instructing is executed when it is determined in said determining that it is the timing for the instructing.

8. A non-transitory computer-readable storage medium storing a computer-executable program for causing a computer to execute a method of controlling an apparatus for transmitting job data to a terminal,
   wherein the method comprises:
   generating the job data;
   instructing, when the terminal is in the energy saving mode, the terminal to shift from the energy saving mode to a normal mode in which the terminal device can process the job data; and
   storing, in a storage unit, information on a time period required for the terminal to shift to the normal mode after the instructing; and
   determining, based on a time period required for generating the job data, and the time period indicated by the information stored in the storage unit, whether or not it is timing for the instructing,
   wherein said instructing is executed when it is determined in said determining that it is the timing for the instructing.

* * * * *